(12) United States Patent
Kikuchi

(10) Patent No.: US 7,667,636 B2
(45) Date of Patent: Feb. 23, 2010

(54) VEHICLE CONTROL SYSTEM

(75) Inventor: Hayato Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/882,608

(22) Filed: Aug. 2, 2007

(65) Prior Publication Data

US 2008/0042894 A1     Feb. 21, 2008

(30) Foreign Application Priority Data

Aug. 3, 2006   (JP)   ............................. 2006-211839
Oct. 17, 2006  (JP)   ............................. 2006-282507

(51) Int. Cl.
G01S 13/93   (2006.01)

(52) U.S. Cl. ......................... 342/70; 342/71

(58) Field of Classification Search ............. 342/70–72; 701/117–119, 300–302; 382/103–107; 340/435–436, 340/901–905
See application file for complete search history.

(56) References Cited

U.S. PATENT DOCUMENTS 4,097,864 A * 6/1978 Endo et al. ..................... 342/71
6,583,403 B1 * 6/2003 Koike et al. ................... 250/221
7,289,017 B2 * 10/2007 Sawamoto et al. ....... 340/425.5
2007/0241870 A1 * 10/2007 Ohmura et al. ............. 340/435

FOREIGN PATENT DOCUMENTS

JP            2000-9841 A      1/2000

* cited by examiner

Primary Examiner—Thomas H Tarcza
Assistant Examiner—Cassi Galt
(74) Attorney, Agent, or Firm—Arent Fox LLP

(57) ABSTRACT

In a vehicle control system, when an inter-vehicular distance between a subject vehicle and a preceding vehicle detected by a radar device is less than or equal to a predetermined value, automatic braking is performed or an alarm is activated to alert a driver to prevent a collision. A stationary object detection threshold value of a reception level of a reflected wave for detecting a stationary object is set higher in a predetermined region compared to a moving object detection threshold value of a reception level of a reflected wave emitted from the radar device for detecting a moving object such as a preceding vehicle. Thus, the system prevents a gate or an article in the roadway, which are not obstacles, from being erroneously recognized as obstacles. As such, unnecessary automatic braking and alarm activation for the gate and the article in the roadway can be prevented.

14 Claims, 26 Drawing Sheets (EMBODIMENT)

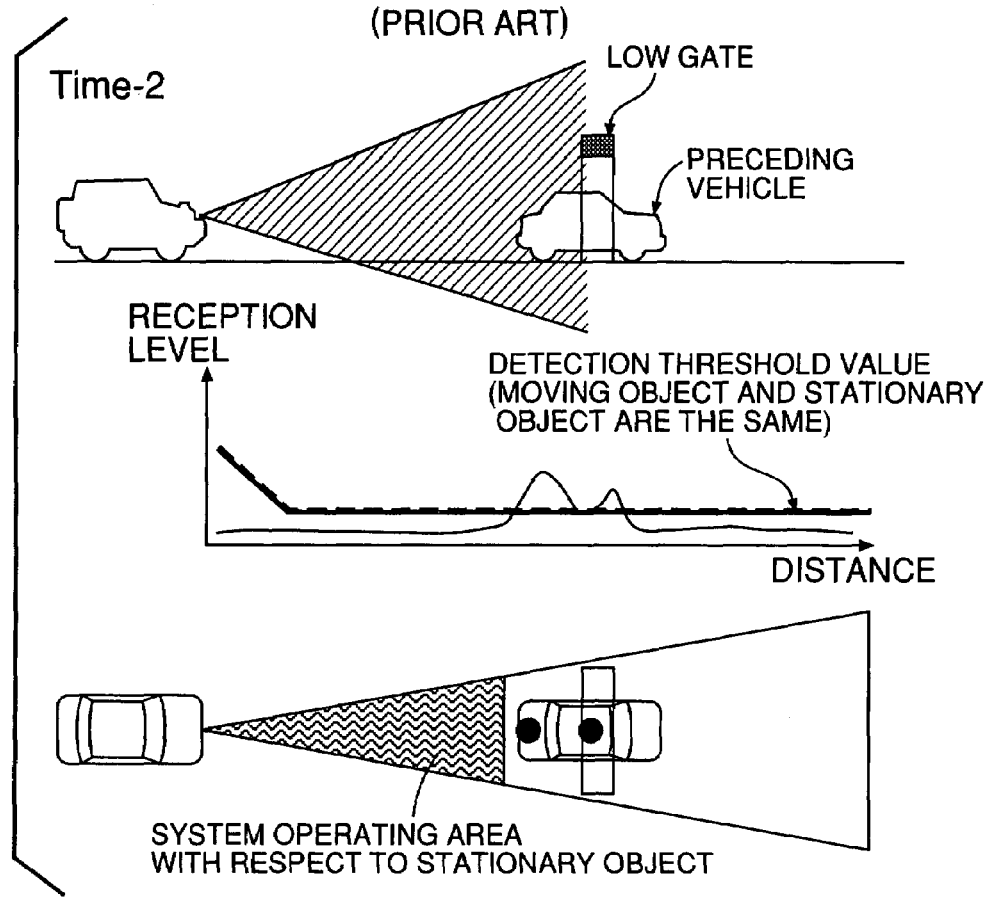
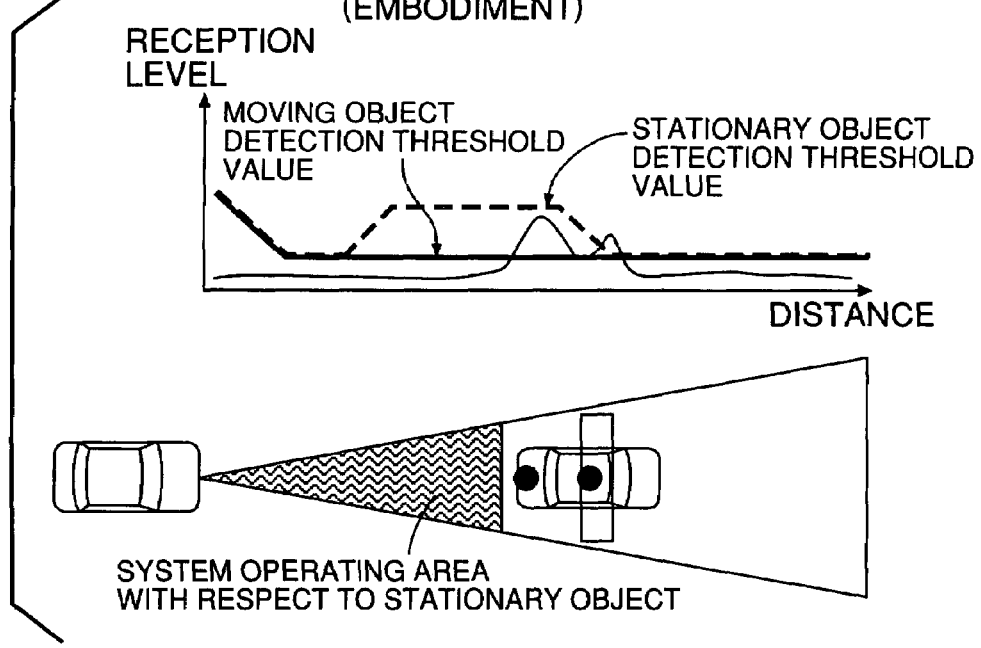

(EMBODIMENT)

(EMBODIMENT)

(EMBODIMENT)

VEHICLE CONTROL SYSTEM

RELATED APPLICATION DATA

The present invention is based upon Japanese priority application Nos. 2006-211839 filed Aug. 3, 2006 and 2006-282507 filed Oct. 17, 2006 which are hereby incorporated in their entirety herein by reference.

BACKGROUND OF THE INVENTION

1. Field of the Invention

The present invention relates to a vehicle control system. The vehicle control system includes a transmitting means mounted on a vehicle for transmitting an electromagnetic wave toward a predetermined detection area. A receiving means receives a reflected wave of the electromagnetic wave transmitted by the transmitting means and reflected from an object. An object detecting means detects the object based on the reflected wave or one of the reflected waves which has a reception level greater than or equal to a detection threshold value received by the receiving means. A vehicle control means controls the vehicle based on a result of detection by the object detecting means.

2. Description of the Related Art

Japanese Patent Application Laid-open No. 2000-9841 discloses an object detection system in which a detection area for detecting a target is divided into a plurality of small detection area sections. A reception level of a reflected wave from each small detection area section is added and stored in an addition memory established for each distance. When the added value exceeds a threshold value, a distance to a target is detected, so that a reflected wave from rain particles or snow particles is prevented from being erroneously detected as a hazardous object during rainfall or snowfall.

In a collision damage alleviating system or a collision preventing system, the system automatically brakes a subject vehicle or raises an alarm for urging the subject vehicle driver to voluntarily brake the subject vehicle in order to avoid colliding against a preceding vehicle or a stationary object. The system is actuated when an inter-vehicular distance between the subject vehicle and the preceding vehicle detected by a radar device decreases to a value less than or equal to a threshold value, or when the collision of the subject vehicle against the stationary object cannot be avoided. However, there is a possibility that a radar device erroneously detects an article in the roadway over which the subject vehicle can pass or a gate under which the subject vehicle can pass as an obstacle, so that an unnecessary automatic braking or alarm is actuated for such a stationary object.

SUMMARY OF THE INVENTION

Accordingly, it is an aspect of the present invention to provide a vehicle control system which prevents the vehicle control from being activated with respect to a stationary object which is not an obstacle to a subject vehicle.

In order to achieve the above aspect, according to a first feature of the present invention, there is provided a vehicle control system that includes a transmitter mounted on a vehicle for transmitting an electromagnetic wave toward a predetermined detection area. A receiver receives a reflected wave of the electromagnetic wave transmitted by the transmitter and reflected from an object. An object detector detects the object based on the reflected wave, or one of the reflected waves which has a reception level greater than or equal to a detection threshold value, received by the receiver. A vehicle controller controls the vehicle based on a result of detection by the object detector. The system further includes an object-type discriminator for discriminating whether the object detected by the object detector is a moving object or a stationary object. A stationary-object detection threshold value setter sets a stationary object detection threshold value to be different from the detection threshold value. When a reception level of a reflected wave from an object, which is determined to be a stationary object, is less than or equal to the stationary object detection threshold value, the vehicle controller determines that the stationary object is not an object for which the vehicle control system will control the vehicle.

With this arrangement, the object-type discriminator discriminates whether the object detected by the object detector is a moving object or a stationary object. The stationary-object detection threshold value setter sets the stationary object detection threshold value to be different from the detection threshold value. When the reception level of the reflected wave from an object determined as being a stationary object is less than or equal to the stationary object detection threshold value, the vehicle controller determines that the stationary object is not an object for which the vehicle control system will control the vehicle. Therefore, it is possible to prevent the vehicle control system from actuating with respect to a stationary object against which the vehicle is not likely to collide.

According to a second feature of the present invention, there is provided a vehicle control system including a transmitter mounted on a vehicle for transmitting an electromagnetic wave toward a predetermined detection area. A receiver receives a reflected wave of the electromagnetic wave transmitted by the transmitter and reflected from an object. An object detector detects the object based on one of the reflected waves received by the receiver, wherein the reflected waves have a reception level greater than or equal to a detection threshold value. A vehicle controller controls the vehicle based on a result of the detection by the object detector. The system further includes an object-type discriminator for discriminating whether the object detected by the object detector is a moving object or a stationary object. A stationary-object detection threshold value setter sets a stationary object detection threshold value to be different from the detection threshold value. When a reception level of a reflected wave from an object, which is determined to be a stationary object, is less than or equal to the stationary object detection threshold value, the vehicle controller changes the vehicle control manner with respect to the stationary object.

With this arrangement, the object-type discriminator discriminates whether the object detected by the object detector is a moving object or a stationary object. The stationary-object detection threshold value setter sets the stationary object detection threshold value to be different from the detection threshold value. When the reception level of the reflected wave from an object determined as being a stationary object is less than or equal to the stationary object detection threshold value, the vehicle controller changes the vehicle control manner with respect to the stationary object. Therefore, it is possible to prevent actuation of the vehicle control with respect to a stationary object against which the vehicle is not likely to collide.

According to a third feature of the present invention, in addition to the second feature, the vehicle controller performs a deceleration control of the vehicle with respect to an object existing in a traveling direction of the vehicle. When a reception level of a reflected wave from an object, which is determined to be a stationary object, is less than or equal to the stationary object detection threshold value, the vehicle controller prevents the deceleration control of the vehicle with respect to the stationary object.

With this arrangement, when the vehicle controller performs deceleration control of the vehicle with respect to the object existing in the traveling direction of the vehicle, but the reception level of the reflected wave from the object determined as being a stationary object is less than or equal to the stationary object detection threshold value, the deceleration control of the vehicle with respect to the stationary object is prevented. Therefore, it is possible to prevent unnecessary deceleration control of the vehicle with respect to the stationary object against which the vehicle is not likely to collide.

According to a fourth feature of the present invention, in addition to any of the first-to-third features, the stationary-object detection threshold value setter sets the stationary object detection threshold value at a value higher than the detection threshold value in a predetermined distance range.

With this arrangement, the stationary-object detection threshold value setter sets the stationary object detection threshold value at a value higher than the detection threshold value in the predetermined distance range. Therefore, it is possible to prevent a stationary object against which the vehicle is not likely to collide from being erroneously recognized as an obstacle.

According to a fifth feature of the present invention, in addition to the fourth feature, the predetermined distance range is a range of about 5 m to 30 m ahead of the vehicle.

With this arrangement, the predetermined distance range in which the detection threshold value is set at a larger value is the range of about 5 m to 30 m ahead of the vehicle. Therefore, it is possible to reliably prevent a stationary object, such as an article in the roadway over which the vehicle can pass, or a stationary object, such as a gate under which the vehicle can pass, from being recognized as an obstacle.

According to a sixth feature of the present invention, in addition to any of the first-to-third features, the stationary-object detection threshold value setter sets the stationary object detection threshold value at different values respectively in a plurality of distance ranges.

With this arrangement, the stationary-object detection threshold value setter sets the stationary object detection threshold value at the different values respectively in the plurality of distance ranges. Therefore, it is possible to set appropriate detection threshold values covering an article in the roadway over a lower end of the detection area and a gate over an upper end of the detection area.

According to a seventh feature of the present invention, in addition to the sixth feature, among the plurality of distance ranges, a first distance range is a range of about 5 m to 20 m, and a second distance range is a range of about 20 m to 30 m. The stationary-object detection threshold value setter sets the stationary object detection threshold value in the second distance range at a value less than the stationary object detection threshold value in the first distance range.

With this arrangement, the stationary object detection threshold value in the second distance range of about 20 m to 30 m is set at a value less than the stationary object detection threshold value in the first distance range of about 5 m to 20 m. Therefore, it is possible to set appropriate detection threshold values with respect to both an article in the roadway and existing in the first distance range and a gate existing in the second distance range, respectively.

According to an eighth feature of the present invention, in addition to any of the first-to-seventh features, the system further includes a vehicle speed detector for detecting a vehicle speed, and a relative speed calculator for calculating a relative speed between the detected object and the vehicle. The object-type discriminator discriminates whether the object detected based on the vehicle speed and the relative speed is a moving object or a stationary object.

With this arrangement, the object-type discriminator discriminates whether the detected object is a moving object or a stationary object based on the vehicle speed and the relative speed. Therefore, it is possible to accurately discriminate between the moving object and the stationary object.

According to a ninth feature of the present invention, there is provided a vehicle control system including a transmitter mounted on a vehicle for transmitting an electromagnetic wave toward a predetermined detection area. A receiver receives a reflected wave of the electromagnetic wave transmitted by the transmitter and reflected from an object. An object detector detects an object existing in a detection area based on the reflected wave received by the receiver. An object-position calculator calculates a position of the object based on a result of the detection by the object detector. An object moving-speed calculator calculates a moving speed of the object based on a last position and a current position of the object calculated by the object-position calculator. A vehicle controller controls the vehicle based on outputs from the object-position calculator and the object moving-speed calculator. The system further includes an object-type discriminator for discriminating whether the object detected by the object detector is a moving object or a stationary object based on the output from the object moving-speed calculator. A detection threshold value setter sets a stationary object detection threshold value. When a reception level of a reflected wave from an object, which is determined to be a stationary object, is less than or equal to the stationary object detection threshold value, the vehicle controller determines that the stationary object is not an object for which the vehicle is controlled, or the vehicle controller changes a vehicle control manner with respect to the stationary object.

With this arrangement, the object-type discriminator discriminates the detected object detected by the object detector as being either the moving object or the stationary object. When the reception level of the reflected wave from the object determined to be the stationary object is less than or equal to the stationary object detection threshold value set by the detection threshold value setter, the vehicle controller determines that such a stationary object is not a subject of control, or changes the vehicle control manner with respect to the stationary object. Therefore, it is possible to prevent an unnecessary control of the vehicle with respect to the stationary object against which the vehicle is not likely to collide.

According to a tenth feature of the present invention, in addition to the ninth feature, the detection threshold value setter sets a moving object detection threshold value to be different from the stationary object detection threshold value. When a reception level of a reflected wave from an object, which is determined to be a moving object, is less than or equal to the moving object detection threshold value, the vehicle controller changes a vehicle control manner with respect to the moving object.

With this arrangement, when the reception level of the reflected wave from the object determined as being the moving object is less than or equal to the moving object detection threshold value and different from the stationary object detection threshold value set by the detection threshold value setter, the vehicle controller excludes the moving object from a subject of control, or changes the details of the control of the vehicle with respect to the moving object. Therefore, it is possible to ensure an accurate control of the vehicle with respect to a moving object.

According to an eleventh feature of the present invention, in addition to the ninth or tenth feature, the vehicle controller performs deceleration control of the vehicle with respect to an object existing in a traveling direction of the vehicle. When a reception level of the reflected wave from the stationary object is less than or equal to the stationary object detection threshold value, the vehicle controller prevents the deceleration control of the vehicle with respect to the stationary object.

With this arrangement, when the vehicle controller performs deceleration control of the vehicle with respect to the object existing in the traveling direction of the vehicle, but the reception level of the reflected wave from the object determined to be the stationary object is less than or equal to the stationary object detection threshold value, the deceleration control of the vehicle with respect to the stationary object is prevented. Therefore, it is possible to prevent an unnecessary deceleration control of the vehicle with respect to the stationary object against which the vehicle is not likely to collide.

According to a twelfth feature of the present invention, in addition to the tenth or eleventh feature, the detection threshold value setter sets the stationary object detection threshold value at a value higher than the moving object detection threshold value in a predetermined distance range.

With this arrangement, the detection threshold value setter sets the stationary object detection threshold value at the value higher than the moving object detection threshold value in the predetermined distance range. Therefore, it is possible to prevent a stationary object against which the vehicle is not likely to collide from being recognized as a hazard.

According to a thirteenth feature of the present invention, in addition to the twelfth feature, the predetermined distance range is a range of about 5 m to 30 m ahead of the vehicle.

With this arrangement, the predetermined distance range in which the detection threshold value is set at the larger value is the range of about 5 m to 30 m ahead of the vehicle. Therefore, it is possible to reliably prevent a stationary object, such as an article in the roadway over which the vehicle can pass, and a stationary object, such as a gate under which the vehicle can pass, from being recognized as an obstacle.

According to a fourteenth feature of the present invention, in addition to any of the ninth-to-eleventh features, the detection threshold value setter sets the stationary object detection threshold value at different values in a plurality of distance ranges.

With this arrangement, the detection threshold value setter sets the stationary object detection threshold value at the different values in the plurality of distance ranges. Therefore, it is possible to set appropriate detection threshold values covering an article in the roadway over a lower end of the detection area and a gate over an upper end of the detection area.

According to a fifteenth feature of the present invention, in addition to the fourteenth feature, among the plurality of distance ranges, a first distance range is a range of about 5 m to 20 m, and a second distance range is a range of about 20 m to 30 m. The detection threshold value setter sets the stationary object detection threshold value in the second distance range at a value less than the stationary object detection threshold value in the first distance range.

With this arrangement, the stationary object detection threshold value in the second distance range of about 20 m to 30 m is set at a value less than the stationary object detection threshold value in the first distance range of about 5 m to 20 m. Therefore, it is possible to set appropriate detection threshold values with respect to both an article in the roadway and existing in the first distance range, and a gate existing in the second distance range, respectively.

The above and other aspects, features and advantages of the invention will become apparent from preferred embodiments taken in conjunction with the accompanying drawings.

BRIEF DESCRIPTION OF THE DRAWINGS

FIGS. 3A and 3B are diagrams for explaining operations of the prior art and the first embodiment of the present invention, respectively, when the preceding vehicle passes the gate;

DETAILED DESCRIPTION OF PREFERRED EMBODIMENTS

A first embodiment of the present invention will now be described with reference to FIGS. 1 to 11.

Figure 1:
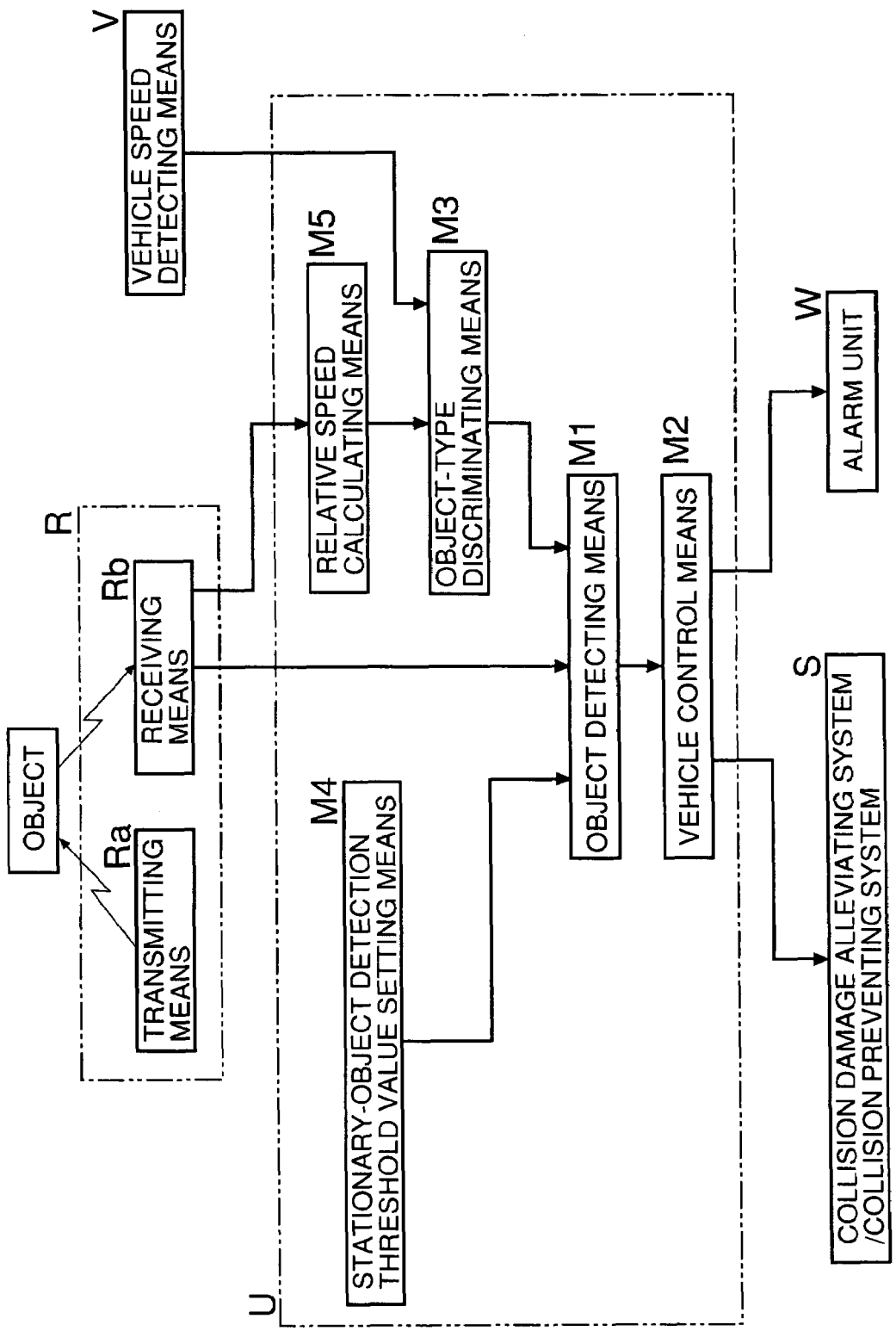
FIG. 1 is a block diagram of an electronic control unit of a vehicle control system according to a first embodiment of the present invention.

As shown in FIG. 1, a vehicle control system according to the first embodiment of the present invention comprises a radar device R which includes a transmitting means Ra for transmitting an electromagnetic wave and a receiving means Rb for receiving a reflected wave of the electromagnetic wave from an object. When a subject vehicle follows a preceding vehicle detected by the radar device R, if an inter-vehicular distance between the subject vehicle and the preceding vehicle decreases below a predetermined value resulting in an increased possibility of collision or an inevitable collision with a stationary object, the vehicle control system actuates a collision preventing system S and an alarm unit W. The collision preventing system S brakes the subject vehicle by automatic braking and the alarm unit W urges a driver to voluntarily brake. An electronic control unit U is connected to the radar device R, the collision preventing system S and the alarm unit W. The electronic control unit U includes an object detecting means M1; a vehicle control means M2; an object-type discriminating means M3; a stationary-object detection threshold value setting means M4; and a relative-speed calculating means M5.

The object detecting means M1 compares a reception level of a reflected wave received by the receiving means Rb of the radar device R with a predetermined detection threshold value and detects only an object for which the reception level is greater than or equal to the detection threshold value. At this time, the object-type discriminating means M3 discriminates whether the object is a moving object or a stationary object based on a subject vehicle speed detected by a vehicle-speed detecting means V and a relative speed of the object detected by the relative-speed calculating means M5. The stationary-object detection threshold value setting means M4 sets a moving object detection threshold value and a stationary object detection threshold value which are different from each other. Therefore, the object detecting means M1 detects the moving object and the stationary object with their respective detection threshold values. Further, the vehicle control means M2 controls the operations of the collision preventing system S and the alarm unit W so that the subject vehicle does not collide with the detected moving object or the detected stationary object.

Next, the operation of the vehicle control system, when the subject vehicle passes through a low gate while following the preceding vehicle, will be described with reference to FIGS. 2A to 5B.

When the subject vehicle mounted with the collision preventing system S detects with the radar device R that the subject vehicle nears an object, such as a preceding vehicle within a predetermined distance, the subject vehicle is automatically braked or an alarm is raised to the driver in order to avoid a collision. At this time, although the possibility of a collision of the subject vehicle against a gate bar may be erroneously recognized despite no possibility thereof, such an erroneous recognition is corrected to prevent an unnecessary control, such as automatic braking or alarm.

Figure 2A:
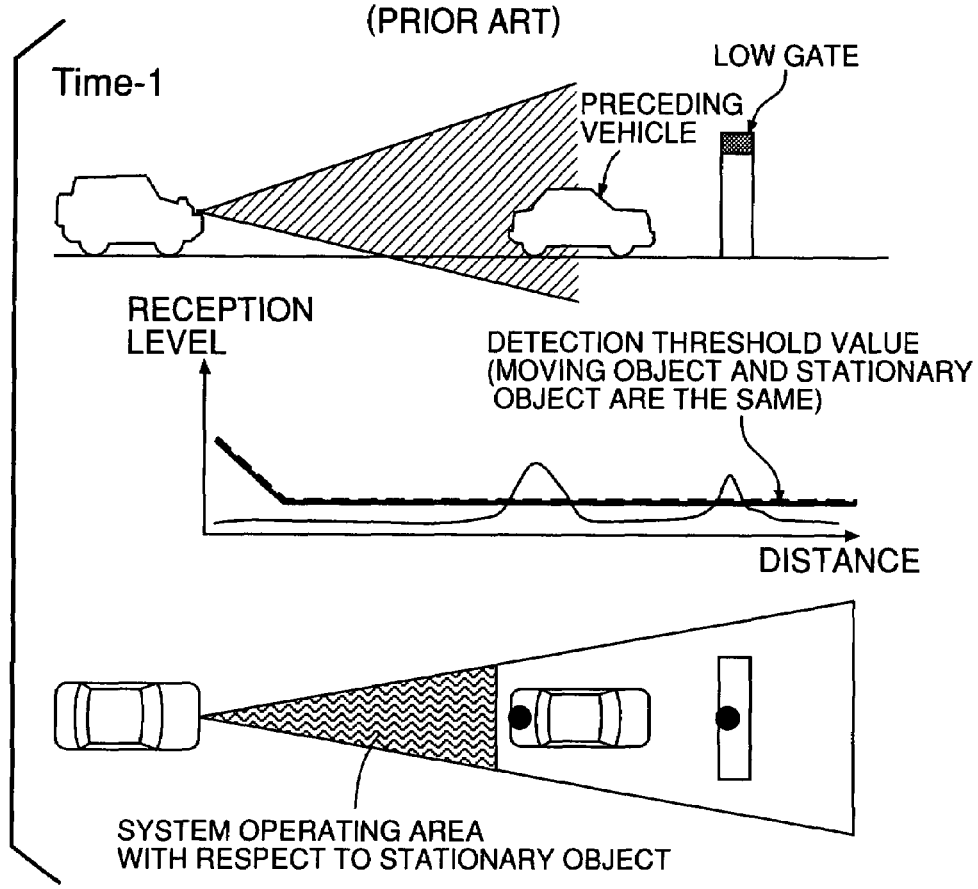
FIGS. 2A and 2B are diagrams for explaining operations of the prior art and the first embodiment of the present invention, respectively, when a preceding vehicle approaches a gate.
Figure 2B:
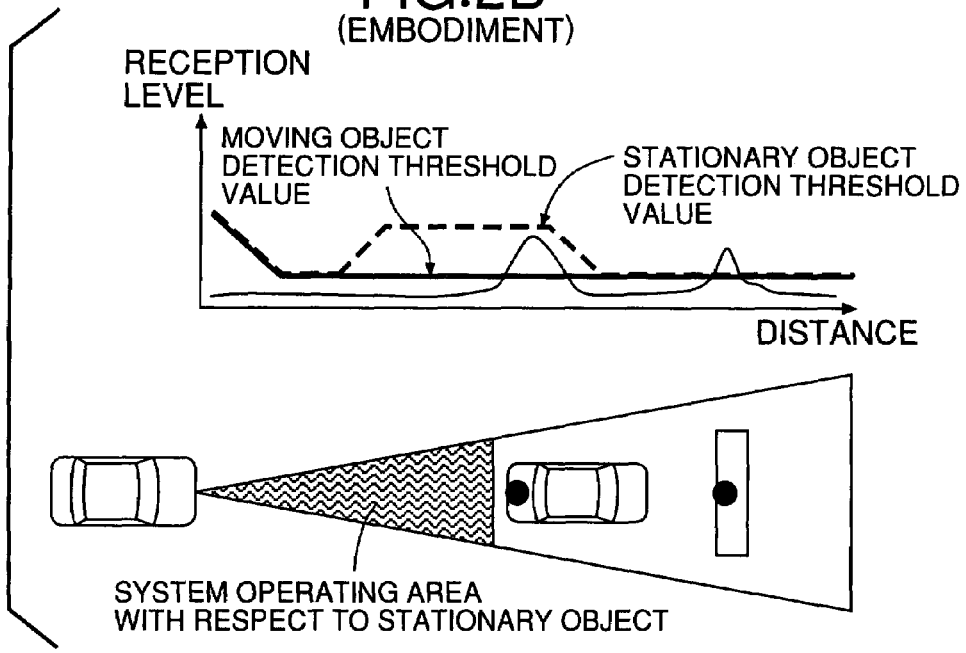

Referring first to FIGS. 2A and 2B (Time-1), when a preceding vehicle traveling ahead of the subject vehicle approaches the gate, the radar device R of the subject vehicle detects the preceding vehicle and the gate. Generally, a vertical detection range of the radar device R is set so that a gate and a pedestrian bridge are not detected, but if the radar device R is turned upward, due to a heavy load mounted in a rear portion of a vehicle body, for example, the radar device R may detect the gate as having a low height.

Specifically, in the prior art, the detection threshold value of a radar device R for a preceding vehicle (a moving object) and that for a gate (a stationary object) are the same. Thus, both the reception level of a wave reflected from the preceding vehicle and that from the gate are higher than the threshold value so both the preceding vehicle and the gate are detected as obstacles. Also in the first embodiment of the present invention, because the stationary object detection threshold value is set to be equal to the moving object detection threshold value, if the gate is far away, the gate still may be detected as an obstacle. However, as the position of the gate is outside of an area for operation of the collision preventing system S, the automatic braking or the alarm are not activated.

As shown in FIGS. 3A and 3B (Time-2), when the preceding vehicle reaches a position to pass through the gate, both the preceding vehicle and the gate are detected in the prior art. In the first embodiment of the present invention, however, as shown in FIG. 3B, both the preceding vehicle and the gate are detected because the subject vehicle is a long distance away from the gate. Also in the example of FIG. 3B, the automatic braking and the alarm are not activated because the position of the gate is outside of the area for operation of the collision preventing system S.

Figure 4A:
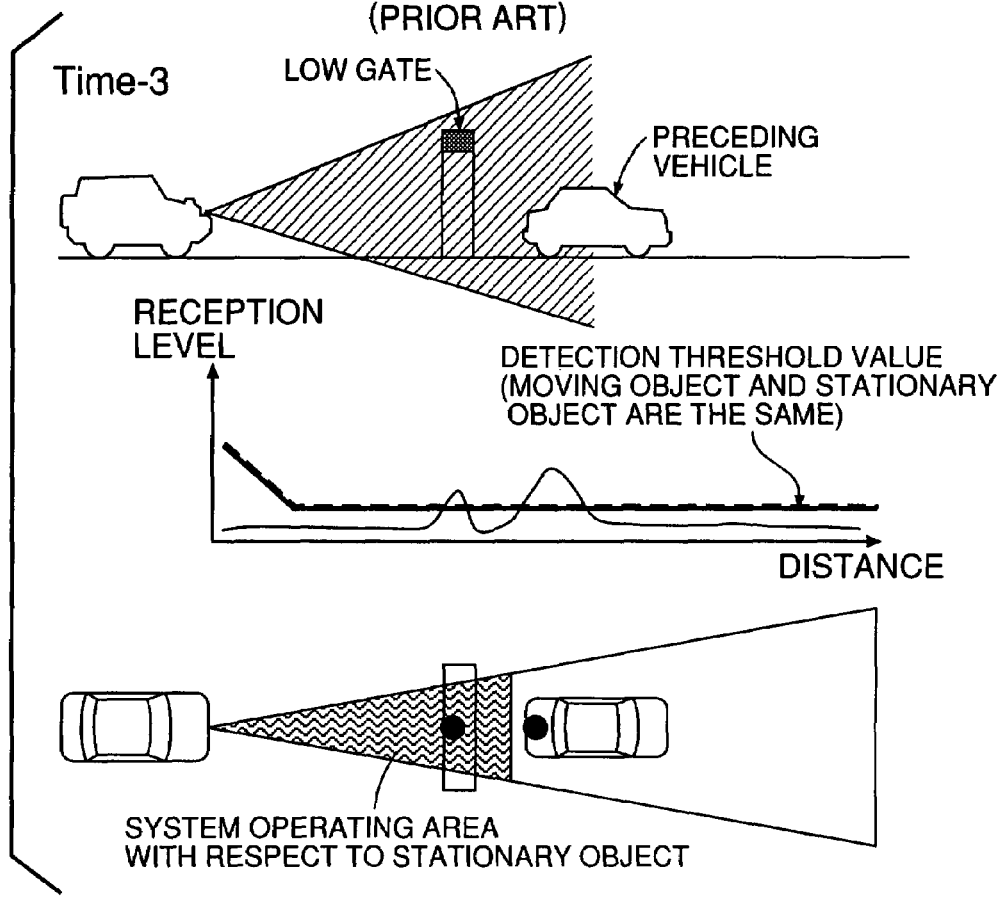
FIGS. 4A and 4B are diagrams for explaining operations of the prior art and the first embodiment of the present invention, respectively, when the preceding vehicle has passed the gate and a subject vehicle approaches the gate.
Figure 4B:
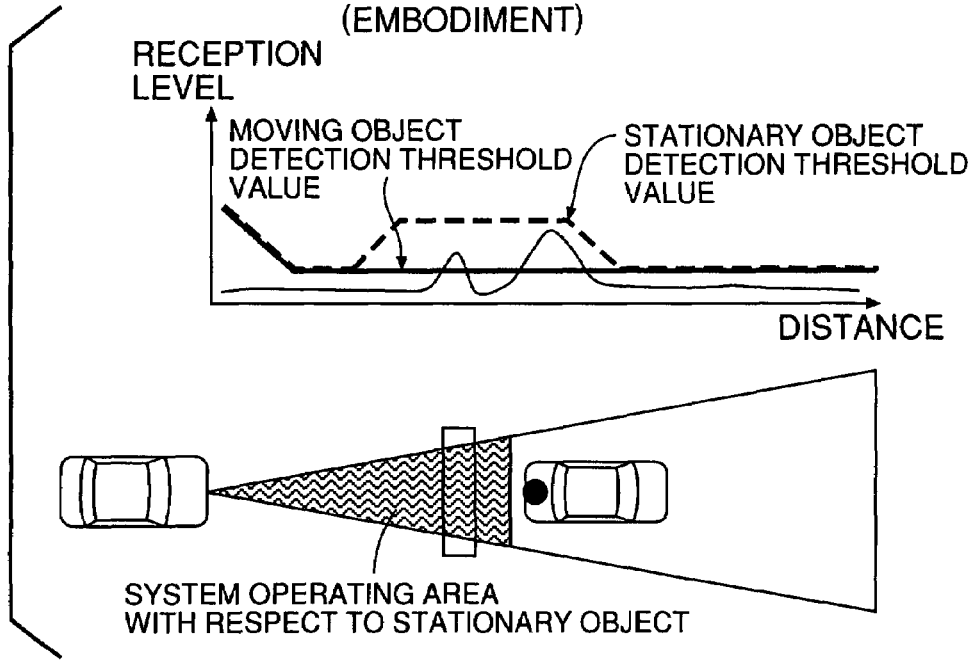

As shown in FIG. 4A (Time-3), when the preceding vehicle has passed through the gate, both the preceding vehicle and the gate are detected as an obstacle in the prior art. In the first embodiment of the present invention, however, as shown in FIG. 4B, the gate is not detected as an obstacle because the stationary object detection threshold value is set to be high in a predetermined distance range. Therefore, even when the position of the gate is within the area for the operation of the collision preventing system S, the automatic braking and the alarm are not activated.

Figure 5A:
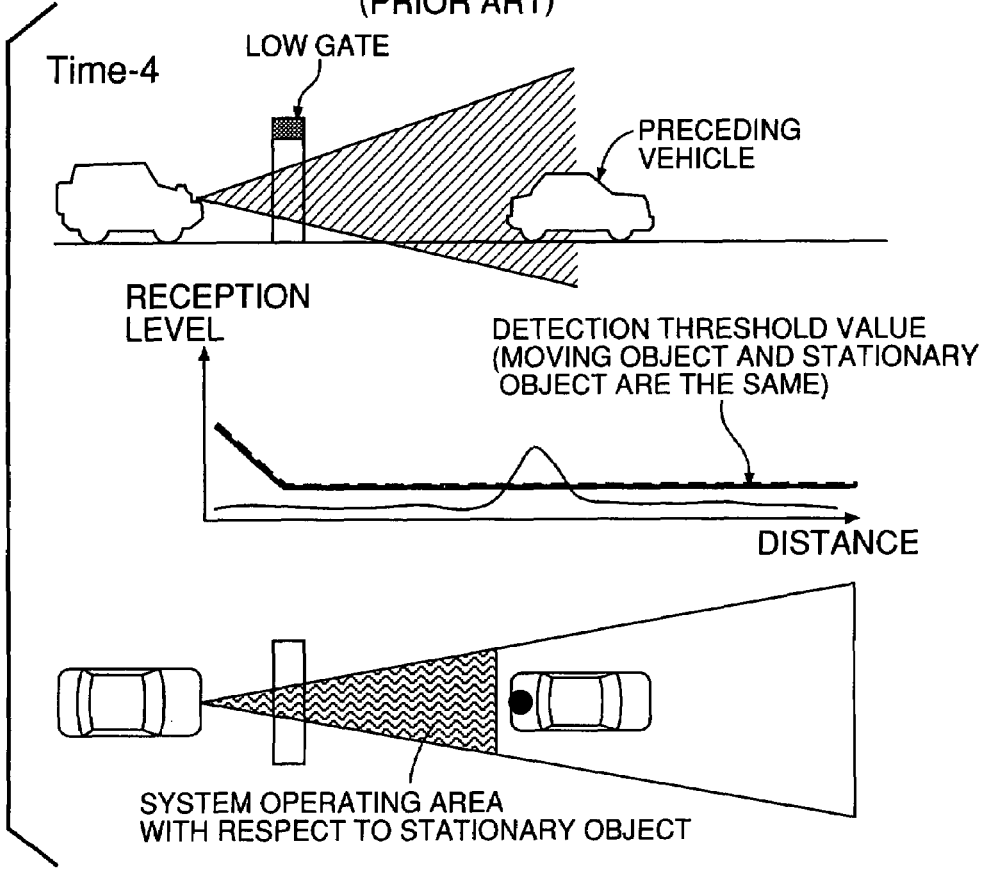
FIGS. 5A and 5B are diagrams for explaining an operation of the prior art and the first embodiment of the present invention, respectively, at a time immediately before the subject vehicle passes the gate.
Figure 5B:
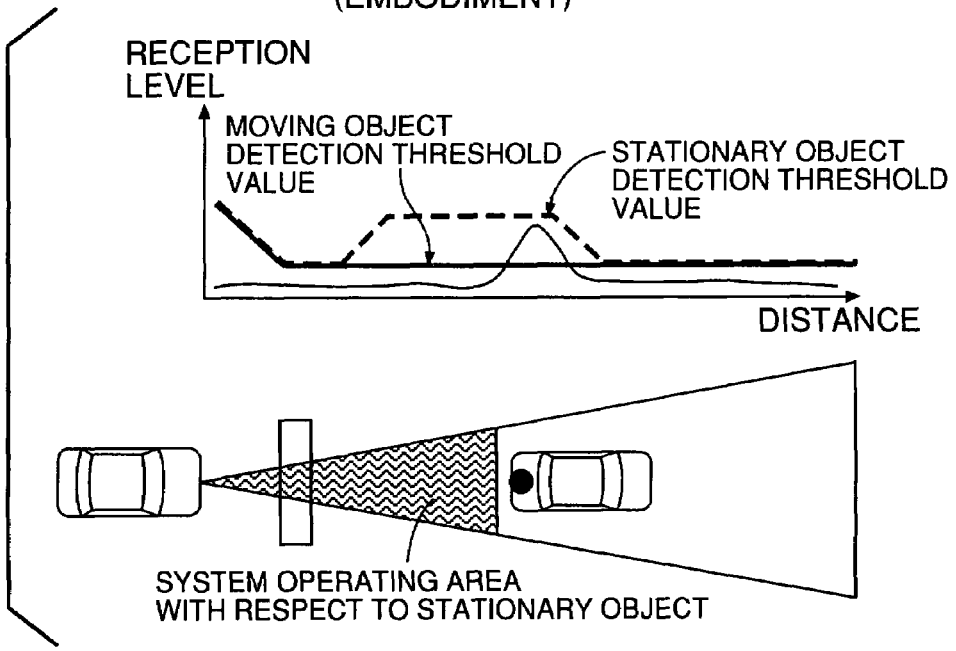

As shown in FIGS. 5A and 5B (Time-4), even if the subject vehicle approaches the gate and thus the gate deviates from the detection range of the radar device, the radar device R continues to detect the preceding vehicle.

Figure 6A:
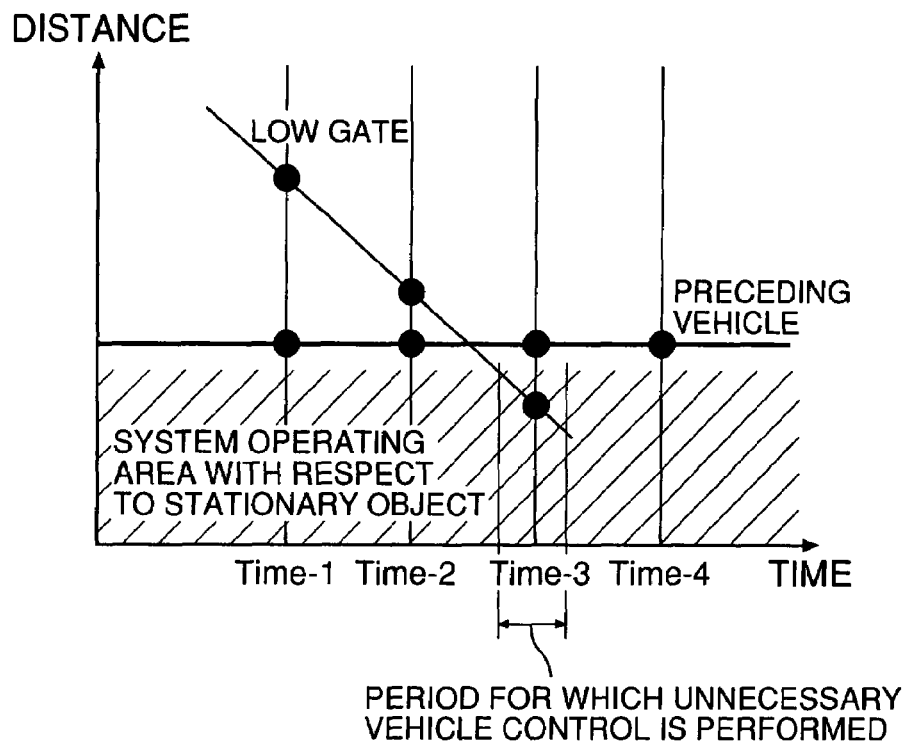
FIGS. 6A and 6B are diagrams showing detected states of the preceding vehicle and the gate with respect to time in the prior art and the first embodiment of the present invention, respectively.
Figure 6B:
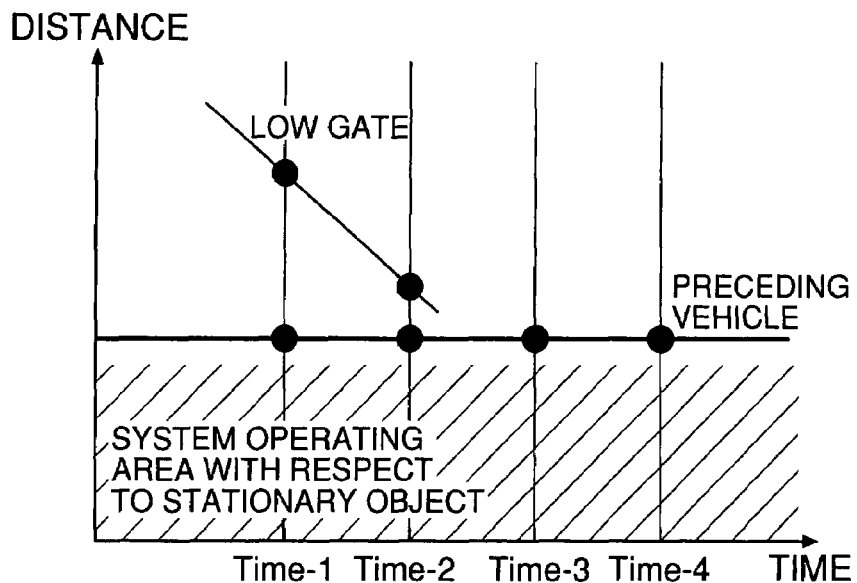

In the time period from Time-1 (FIG. 2B) to Time-4 (FIG. 5B), if the inter-vehicular distance between the preceding vehicle detected by the radar device R and the subject vehicle becomes a predetermined value or less, the automatic braking or the alarm operation for avoiding the collision against the preceding vehicle is activated as usual. However, according to the first embodiment of the present invention, because the stationary object detection threshold value is set to be high in the predetermined distance range in the state shown in FIG. 4B (Time-3), the gate is not detected as an obstacle, as shown in FIG. 6B. Thus, unnecessary automatic braking or alarm operation based on an erroneous recognition of the gate as an obstacle is prevented. On the other hand, in the prior art, the stationary object detection threshold value is set to be low as shown in FIG. 4A (Time-3). Thus, as shown in FIG. 6A, the gate is erroneously recognized as an obstacle, and unnecessary automatic braking and alarm operation occur.

Figure 7A:
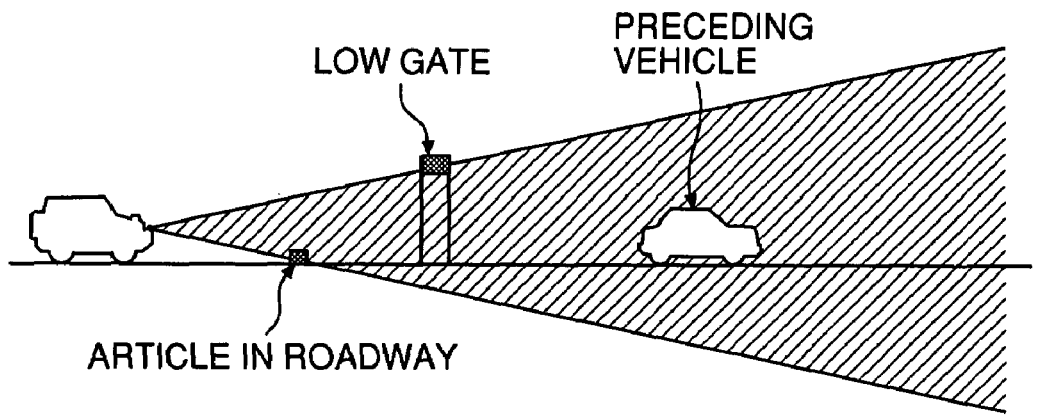
FIGS. 7A and 7B are diagrams showing detection threshold values for a moving object and detection threshold values for a stationary object for respective areas according to a first embodiment of the present invention.
Figure 7B:
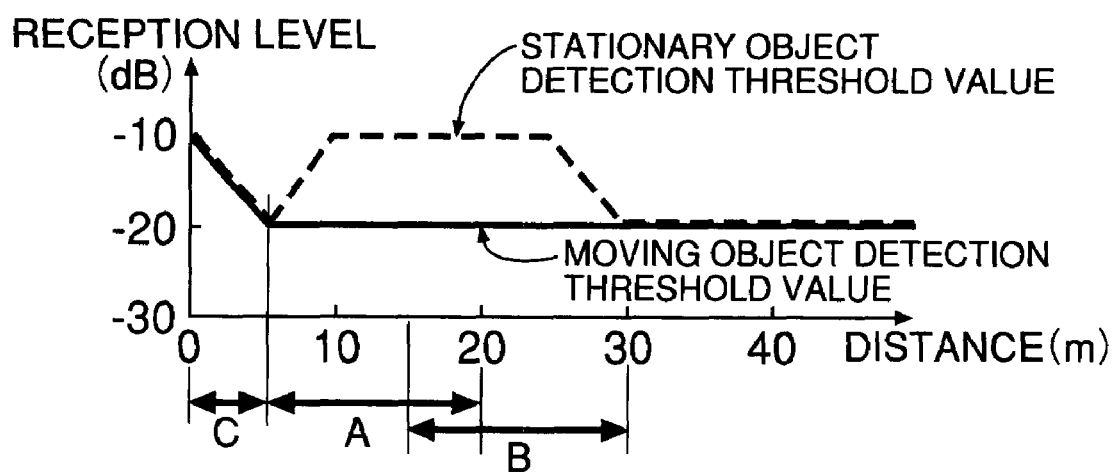

FIG. 7B shows a moving object detection threshold value (in a solid line) and a stationary object detection threshold value (in a broken line). Each threshold value is a function of a distance measured forward from the subject vehicle, wherein the moving object detection threshold value and the stationary object detection threshold value are decreased from −10 dB to −20 dB in an extremely close range from 0 m to 5 m (see region C). The reason why the detection threshold values are set to be high in the extremely close range is to prevent a wave reflected from snow particles or rain particles from being erroneously detected as a wave reflected from a target such as a preceding vehicle or a gate.

In a region more than 5 m ahead of the subject vehicle, the moving object detection threshold value is fixed at a constant value of −20 dB. On the other hand, the stationary object detection threshold value is increased to −10 dB in a region A from 5 m to 20 m ahead of the subject vehicle; increased to −10 dB in a region B from 15 m to 30 m; and fixed at −20 dB, the same as the moving object detection threshold value. The reason why the stationary object detection threshold value is increased to −10 dB in the region A from 5 m to 20 m is to prevent an article in the roadway, as shown in FIG. 7A, from being detected at a lower end of a detection beam. The reason why the stationary object detection threshold value is increased to −10 dB in the region B from 15 m to 30 m is to prevent a low gate, as shown in FIG. 7A, from being detected at an upper end of the detection beam.

The above-described operation will be described in detail with reference to the flowcharts shown in FIGS. 8 to 11.

Figure 8:
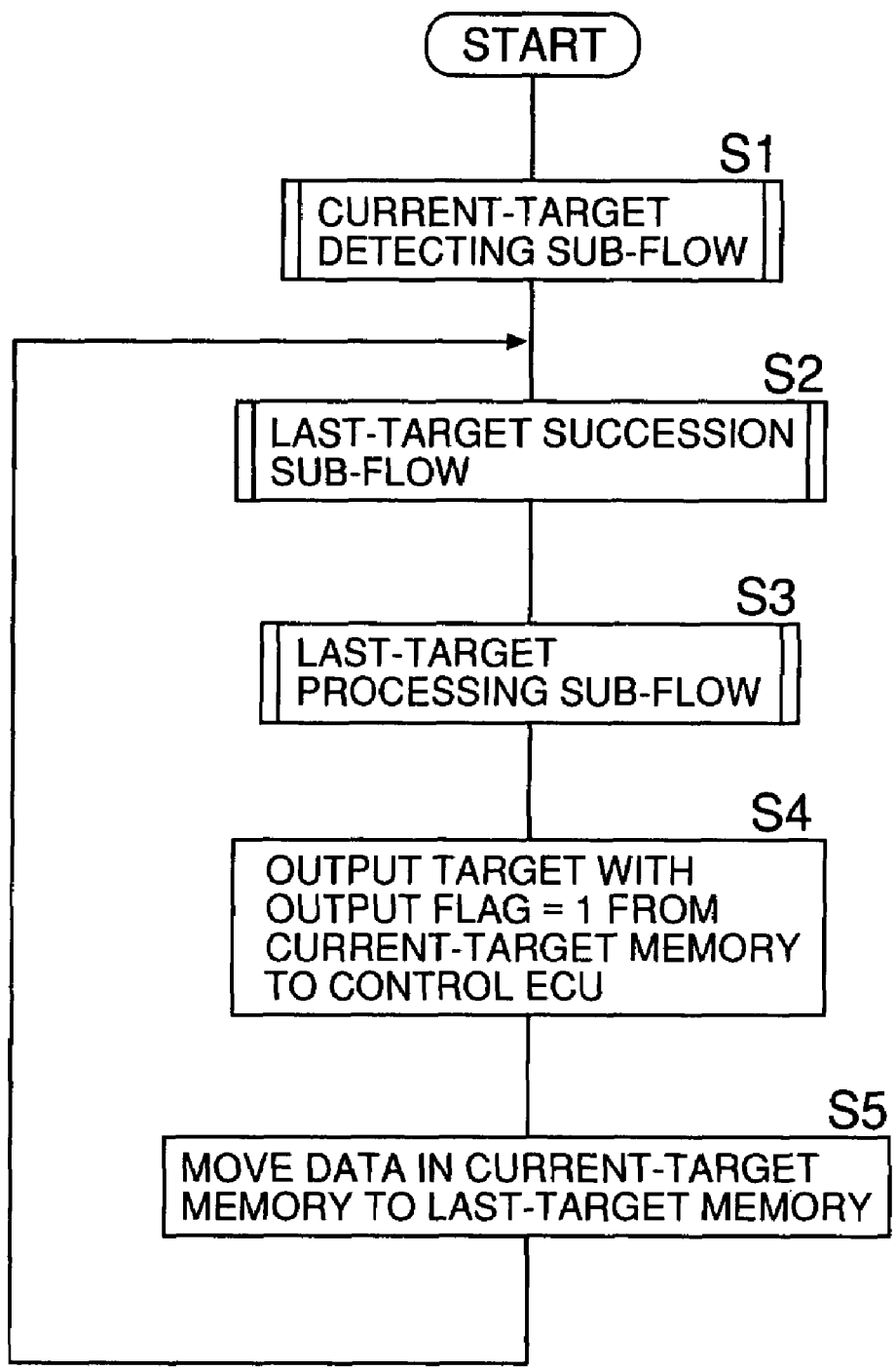
FIG. 8 is a diagram showing a main flowchart according to a first embodiment of the present invention.

FIG. 8 shows a main flowchart, wherein a current-target detecting sub-flow is performed at Step S1; a last-target succession sub-flow is performed at Step S2; a last-target processing sub-flow is performed at Step S3; a target having an output flag set to "1" in a current-target memory is output to the electronic control unit U at Step S4 and the automatic braking or the alarm operation is performed; and data in the current-target memory is moved to a last-target memory at Step S5.

Figure 9:
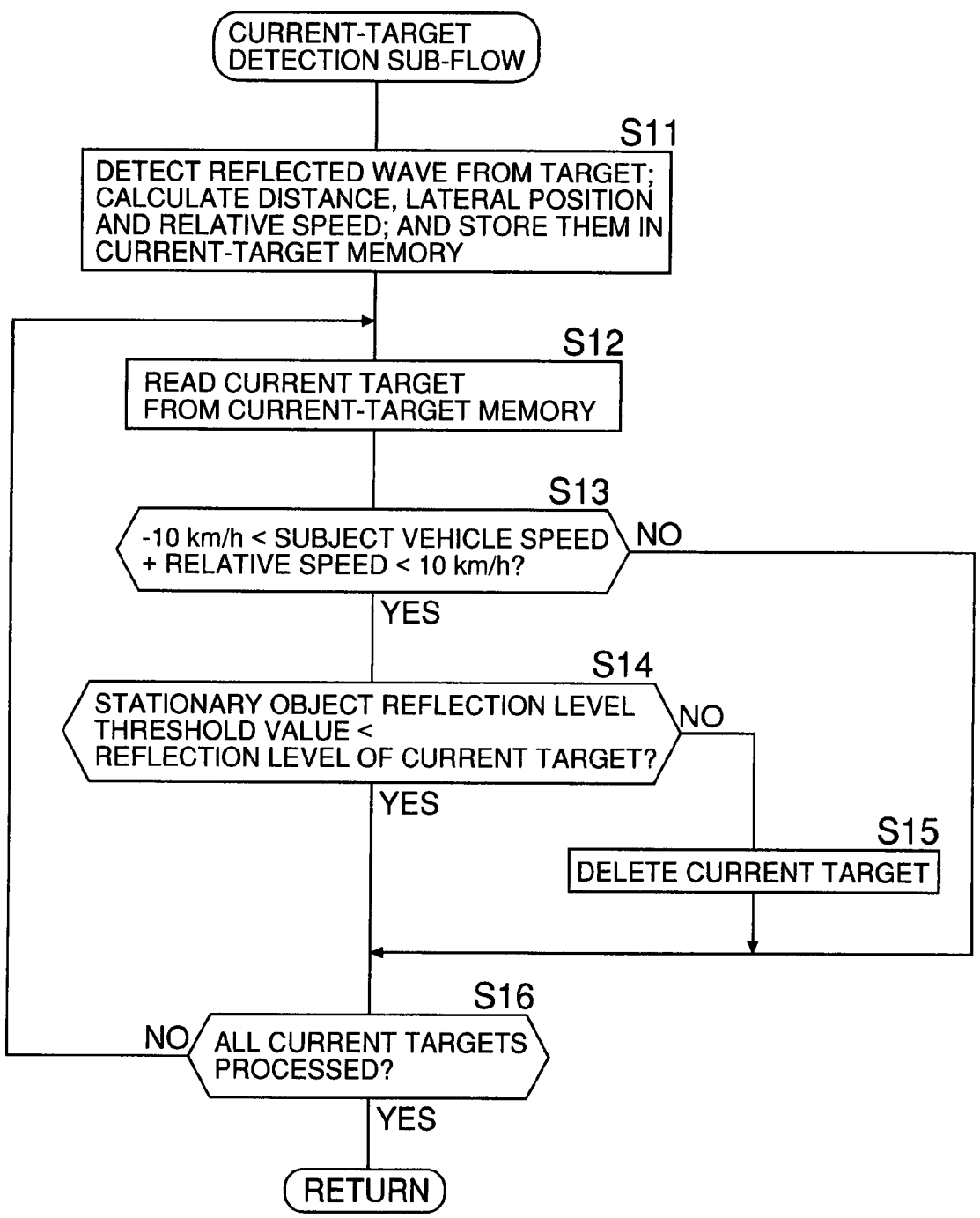
FIG. 9 is a diagram showing a current-target detection sub-flowchart according to a first embodiment of the present invention.

FIG. 9 shows the details of Step S1 (current-target detecting sub-flow) shown in the flowchart of FIG. 8. At Step S11, a wave reflected from a target is detected. A distance to the target, a lateral position of the target, and a relative speed between the subject vehicle and the target are calculated and stored in the current-target memory. At Step S12, the current target is read from the current-target memory. At Step S13, if a value of "a subject vehicle speed"+"a relative speed between the subject vehicle and the target" is within a range from −10 km/h to +10 km/h including detection errors, namely, if the target is approaching the subject vehicle at a speed equal to a subject vehicle speed ±10 km/h, the target is determined as a stationary object, and the procedure advances to Step S14.

At Step S14, a reflection level of the wave from the current target is compared with a stationary object reflection level threshold value (see FIGS. 7A and 7B). If a relationship of the stationary object reflection level threshold value being less than the reflection level of the current target is not established, the current target is determined to be a target against which the subject vehicle is not likely to collide, namely, the current target is determined to be an article in the roadway or a gate. Accordingly, the current target is deleted from the memory at Step S15. Then, the procedure from Step S12 to S15 is repeated until the system confirms, at Step S16, that all the current targets have been processed.

As described above, if the level of the wave reflected from the current target is less than the stationary object reflection level threshold value, the current target is deleted from the memory, thereby preventing an unnecessary vehicle control with respect to the current target from being activated.

Figure 10:
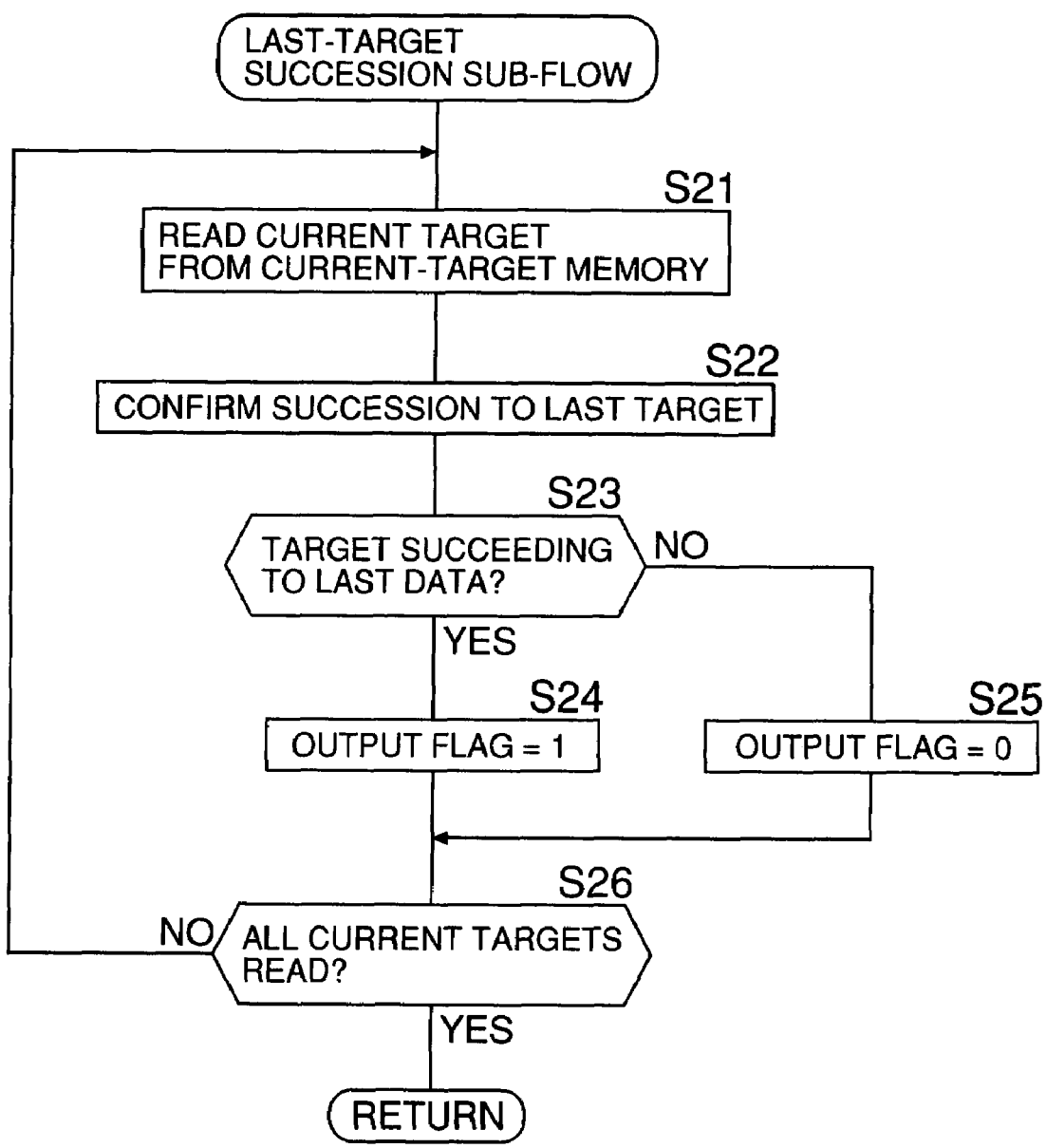
FIG. 10 is a diagram showing a last-target succession sub-flowchart according to a first embodiment of the present invention.

FIG. 10 shows the details of Step S2 (last-target succession sub-flow) shown in the flowchart of FIG. 8. At Step S21, the current target is read from the current-target memory, and at Step S22, the succession from the last target is confirmed. In this succession, a relative position of the current target is estimated on the basis of a relative position of the last target to the position of the subject vehicle and in consideration of a relative speed of the last target. If the current target exists in the vicinity of the estimated position, the current target is determined to be the same as the last target and the current target succeeds to the last target.

At Step S23, if the current target is one succeeding to the last target, the output flag is set to "1" at Step S24. If the current target is not one succeeding to the last target, the output flag is set to "0" at Step S25. Then, the procedure from Step S21 to S25 is repeated until it is confirmed at Step S26 that all the current targets have been read.

The current target having the output flag "1" is output to the electronic control unit U at Step S4 in the flowchart of FIG. 8 to be a subject of the control performed by the collision preventing system S. If the current target has a low reliability because the current target is not one succeeding to the last target, the output flag is cleared by "0", and thus the vehicle control with respect to the current target will not be performed.

Figure 11:
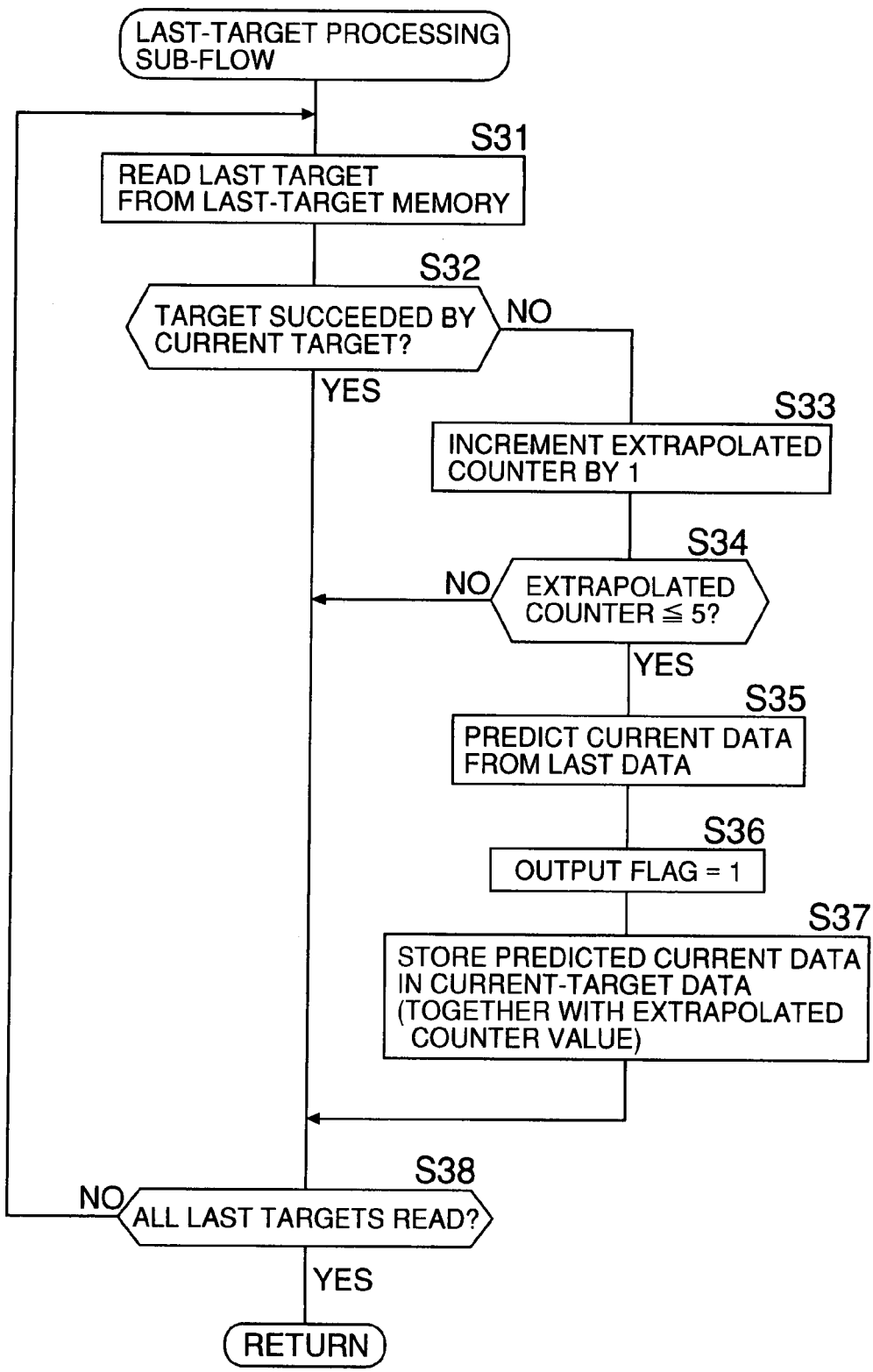
FIG. 11 is a diagram showing a last-target processing sub-flowchart according to a first embodiment of the present invention.

FIG. 11 shows the details of Step S3 (sub-flow for processing the last target) shown in the flowchart of FIG. 8. At Step S31, the last target is read from the last-target memory. If the read last target is not one succeeded by the current target at Step S32, an extrapolated counter is incremented by 1 at Step S33. At Step S34, if the extrapolated counter has a counter value less than or equal to 5, current date is predicted from the last data at Step S35, namely, a current position of the target is predicted from a last position of the target. At Step S36, the output flag is set to "1" so that the target becomes a subject of control by the collision preventing system S. At Step S37, the predicted current data and the counter value of the extrapolated counter are stored in a current-target data.

When the read last target is not one succeeded by the current target at Step S32, when the extrapolated counter has a counter value exceeding 5 at Step S34, or when the procedure passes through Step S37, the procedure from Step S31 to Step S37 is repeated until the system confirms at Step S38 that all the last targets have been read.

Next, a second embodiment of the present invention will now be described with reference to FIGS. 12 to 14.

In the first embodiment of the present invention, if the reception level of the reflected wave from the stationary object is less than the stationary object detection threshold value at the stage of detecting the current target, such a target is deleted and regarded as having not been detected. In the second embodiment of the present invention, however, the extrapolated counter is set to "1" and the deletion of the target is not performed. Generally, the current data is predicted from the last data and used as extrapolated data. However, if the reception level of the reflected wave from the stationary object is less than the stationary object detection threshold value and the extrapolated counter is set to "1", the prediction of the current data from the last data is not performed and the detected data is used as it is.

In the processing by the electronic control unit U, the extrapolated data is also regarded as a subject for which the vehicle control is performed. However, performing a ½-assist control enables a vehicle control corresponding to the extrapolated data having a low accuracy compared to actual data. The term "½-assist control" means a control having an intension which is weakened compared to that of a full-assist control. Specifically, the ½-assist control is performed when a braking force deceleration is set to be less than that in the full-assist control when the automatic braking is activated, and only when an alarm operation is activated. Conversely, an automatic braking and an alarm are activated during the full-assist control and at other times.

Figure 12:
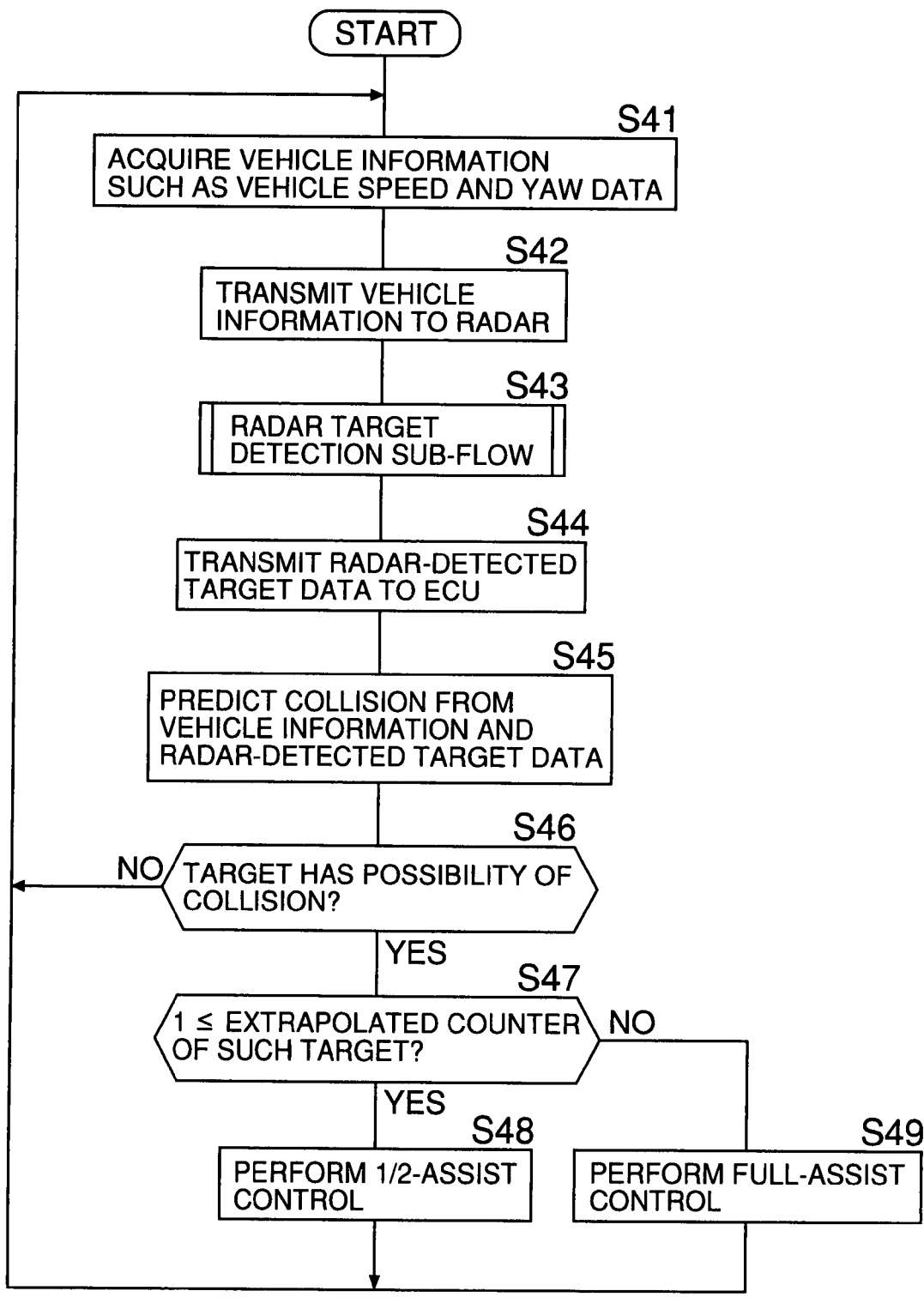
FIG. 12 is a diagram showing a main flowchart according to a second embodiment of the present invention.

At Step S41 of a main flow shown in FIG. 12, vehicle data such as a vehicle speed and a yaw rate are acquired. At Step S42, vehicle information is transmitted to the radar device R. At Step S43, a radar target detection sub-flow, described below, is performed. At Step S44, a radar-detected target is transmitted to the electronic control unit U. At Step S45, a collision is predicted from the vehicle information and the radar-detected target. If it is confirmed at Step S46 that there is a target having a possibility of collision and it is confirmed at Step S47 that there is a target for which the extrapolated counter has a counter value larger than 1, the ½-assist control is performed at Step S48. If there are no targets, the full-assist control is performed at Step S49.

Figure 13:
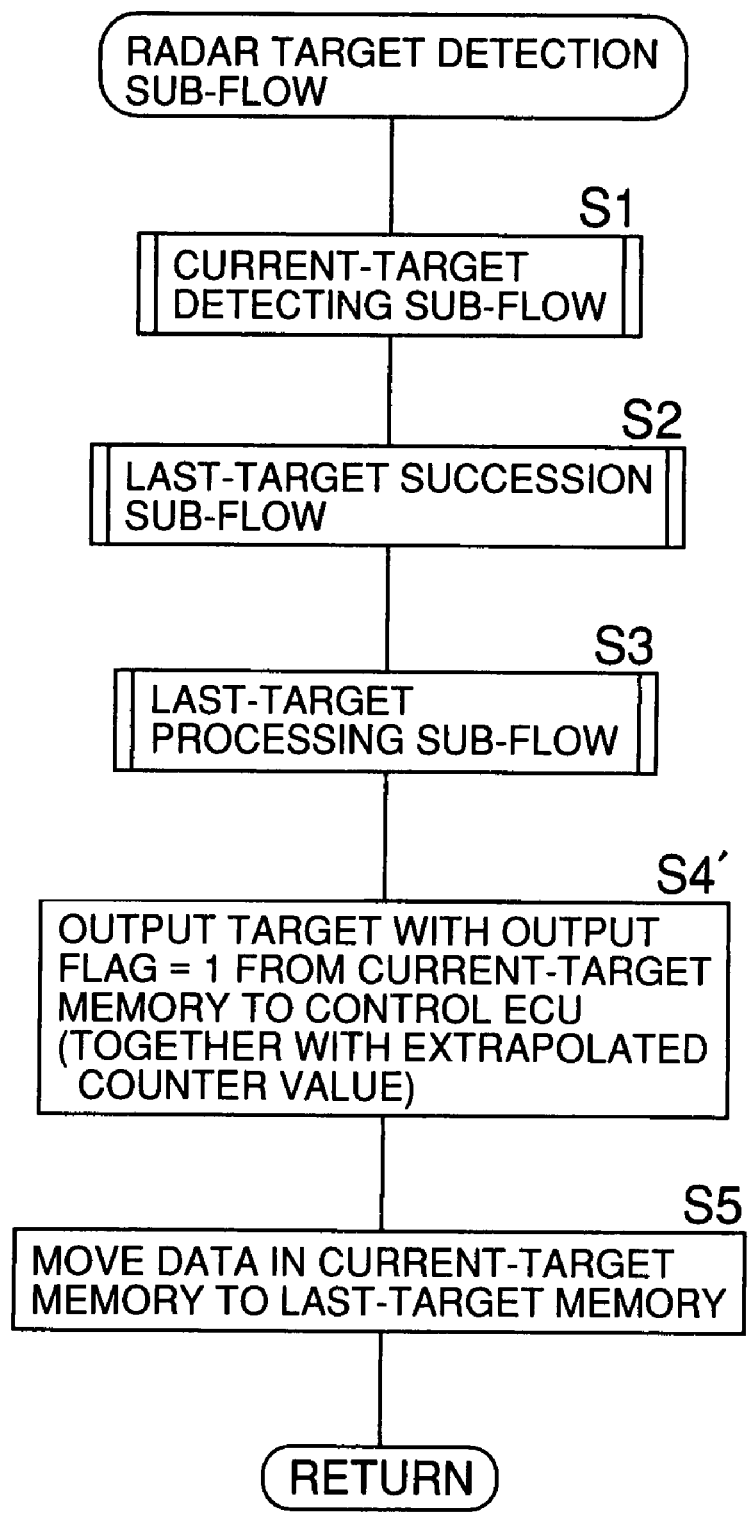
FIG. 13 is a diagram showing a radar target detection sub-flowchart according to a second embodiment of the present invention.

FIG. 13 shows the details of Step S43 (radar target detection sub-flow) shown in the flowchart of FIG. 12. This sub-flow is basically the same as the flowchart in FIG. 8, except that, when a target having the output flag "1" in the current-target memory is output to the electronic control unit U at Step S4', a counter value of the extrapolated counter is output at the same time.

Figure 14:
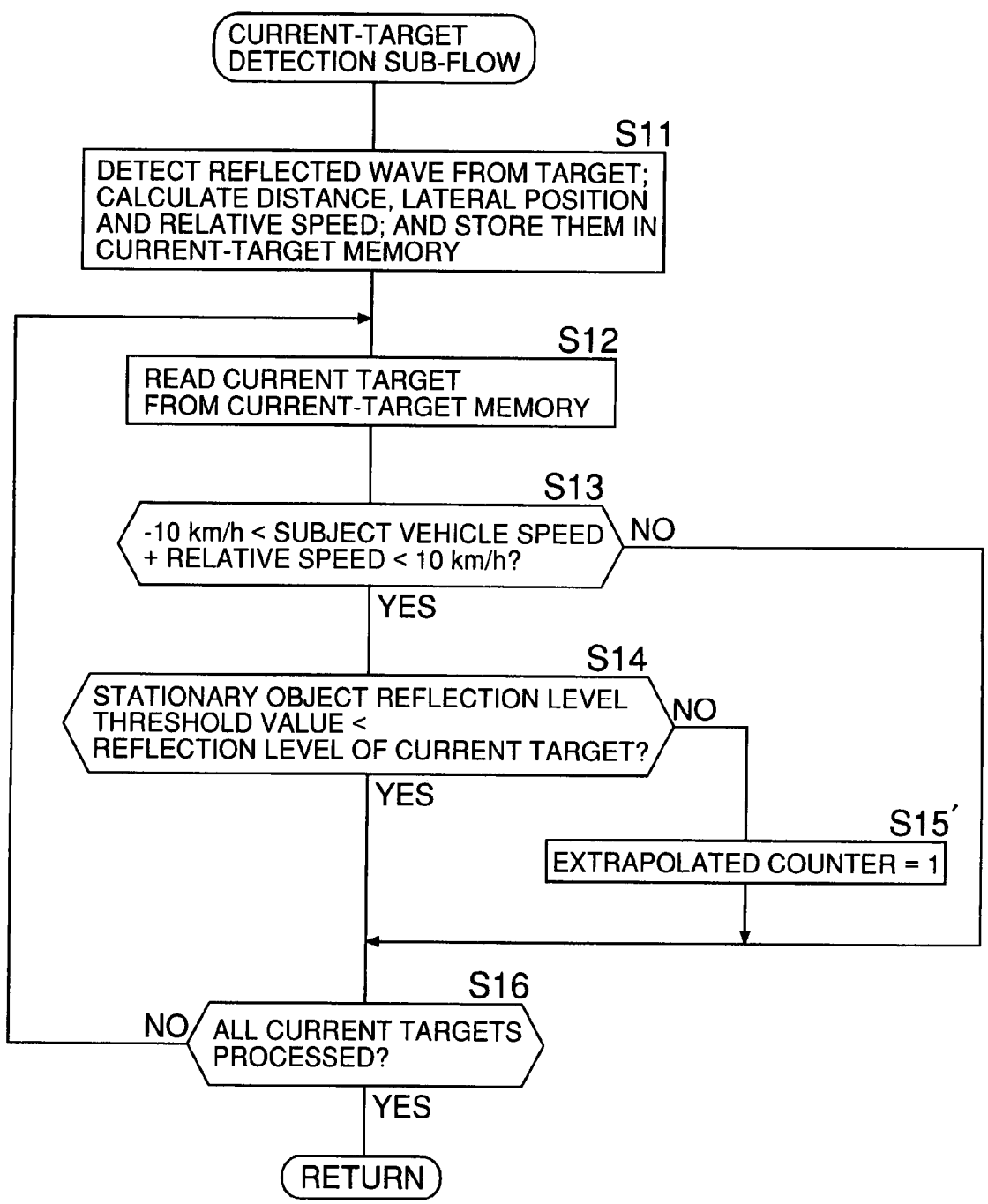
FIG. 14 is a diagram showing a current-target detection sub-flowchart according to a second embodiment of the present invention.

FIG. 14 shows the details of Step S1 (current-target detection sub-flow) shown in the flowchart of FIG. 13. This sub-flow is basically the same as the flowchart in FIG. 9, except that the extrapolated counter is set to "1" at Step S15' instead of deleting the current target.

A third embodiment of the present invention will now be described with reference to FIGS. 15 to 21.

Figure 15:
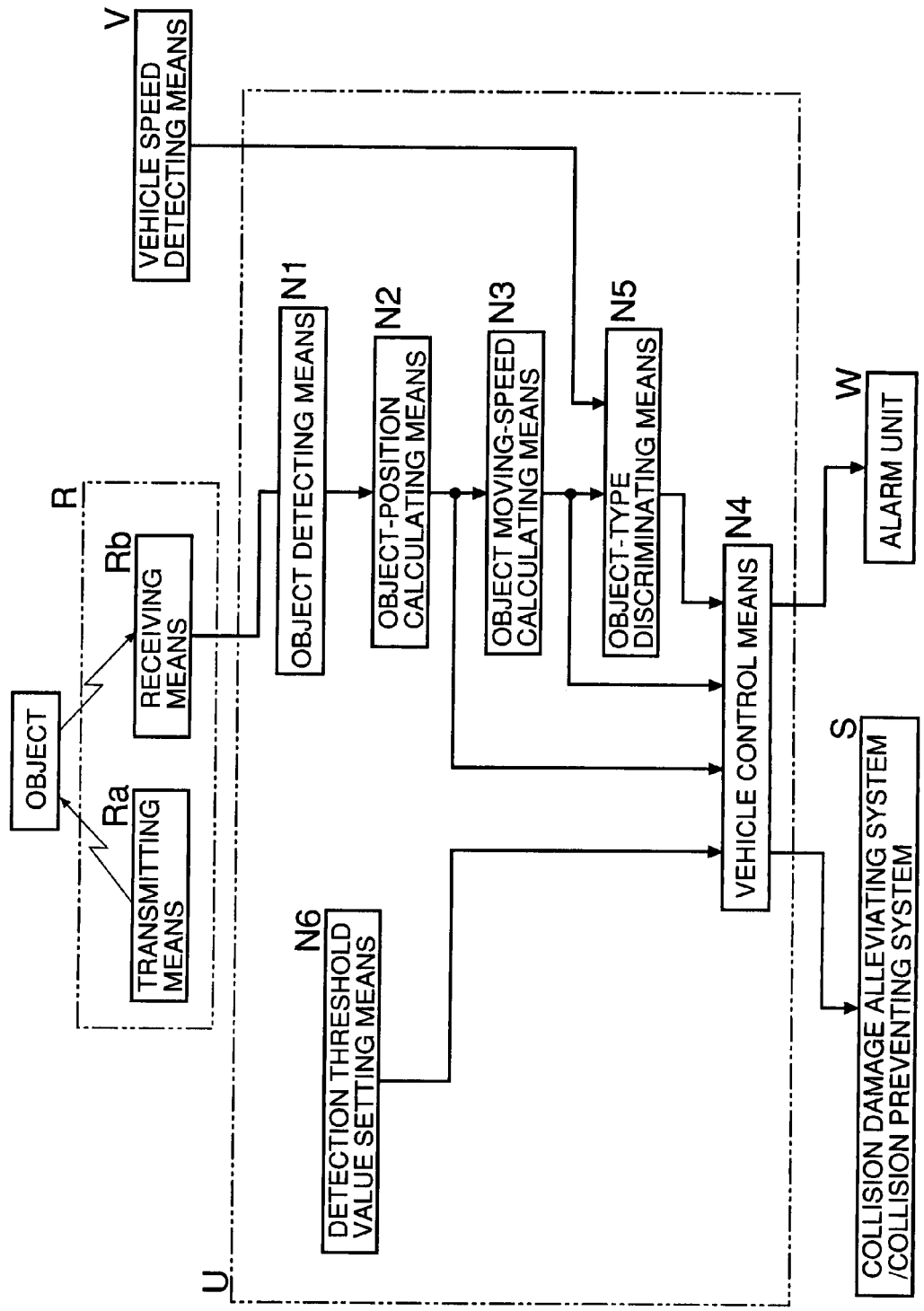
FIG. 15 is a block diagram of an electronic control unit of a vehicle control system according to a third embodiment of the present invention.

As shown in FIG. 15, a vehicle control system according to the third embodiment of the present invention comprises a radar device R which includes a transmitting means Ra for transmitting an electromagnetic wave, and a receiving means Rb for receiving a reflected wave of the electromagnetic wave from an object. When a subject vehicle follows a preceding vehicle detected by the radar device R, if an inter-vehicular distance between the subject vehicle and the preceding vehicle decreases below a predetermined value resulting in an increased possibility of collision or an inevitable collision with a stationary object, a collision preventing system S for braking the subject vehicle by automatic braking is operated, and an alarm unit W activates an alarm urging a driver to voluntarily brake. The radar device R of the third embodiment includes a laser radar device or a pulse radar device. An electronic control unit U is connected to the radar device R, the collision preventing system S and the alarm unit W and includes an object detecting means N1; an object-position calculating means N2; an object moving-speed calculating means N3; a vehicle control means N4; an object-type discriminating means N5; and a detection threshold value setting means N6.

The object detecting means N1 detects an object existing in a predetermined detection area ahead of the subject vehicle based on a reflected wave received by the receiving means Rb of the radar device R. The object-position calculating means N2 calculates a position of the object detected by the object detecting means N1. The object moving-speed calculating means N3 calculates a moving speed of the object by dividing a distance difference between a position of the object at the time of last detection and a position of the object at the time of current detection by a detection time lag therebetween.

At this time, the object-type discriminating means N5 discriminates between the type of object detected (a moving object or a stationary object) based on a subject vehicle speed detected by a vehicle-speed detecting means V and a moving speed (relative speed with respect to the subject vehicle) of the object calculated by the object moving-speed calculating means N3. The detection threshold value setting means N6 sets a moving object detection threshold value and a stationary object detection threshold value, respectively. Therefore, the vehicle control means N4 controls the operations of the collision preventing system S and the alarm unit W so that the subject vehicle does not collide with the detected moving object or the detected stationary object.

Next, the operation of the vehicle control system when the subject vehicle passes through a low gate while following the preceding vehicle will be described in detail with reference to the flowcharts shown in FIGS. 16 to 20.

Figure 16:
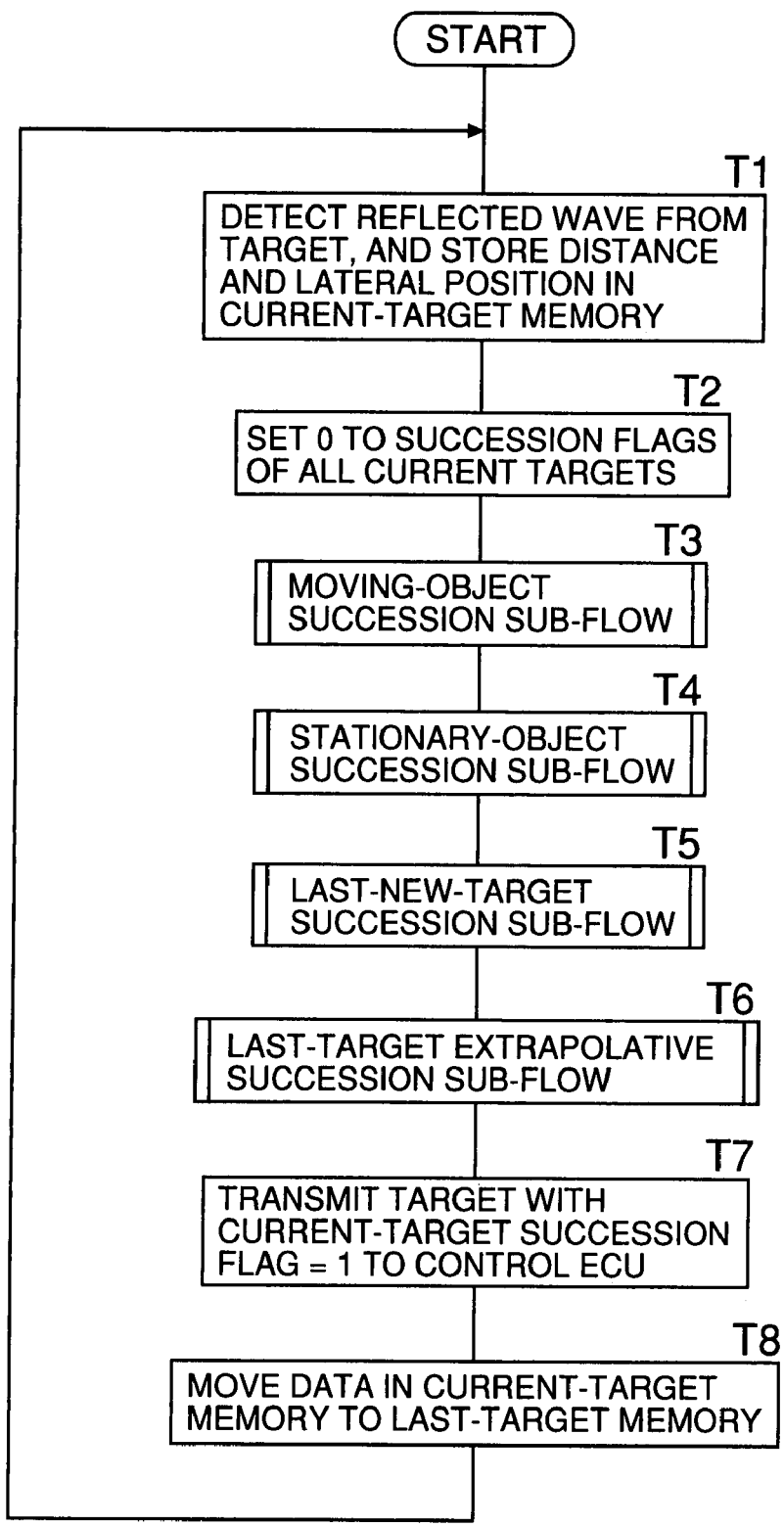
FIG. 16 is a diagram showing a main flowchart according to a third embodiment of the present invention.

At Step T1 of a main flow in FIG. 16, a reflected wave from a target is detected, and a position (distance and direction) of the target is stored in a current-target memory. At Step T2, succession flags of all the current-targets are reset to "0" (which indicates that succession is incomplete). At Step T3, a moving-object succession sub-flow is performed. At Step T4, a stationary-object succession sub-flow is performed. At Step T5, a last-new-target succession sub-flow is performed. At Step T6, a last target extrapolative succession sub-flow is performed. At Step T7, a current target having a succession flag "1" (which indicates that succession is completed) is output to the electronic control unit U to perform the automatic braking and the alarm operation. At Step T8, data in the current-target memory is moved to a last-target memory.

In this target succession, a relative position of the current target is estimated on the basis of a relative position of the last target to the position of the subject vehicle and in consideration of a relative speed of the last target. If the current target exists within a predetermined range around the estimated position, the current target is determined to be the same as the last target and the current target succeeds to the last target.

Figure 17:
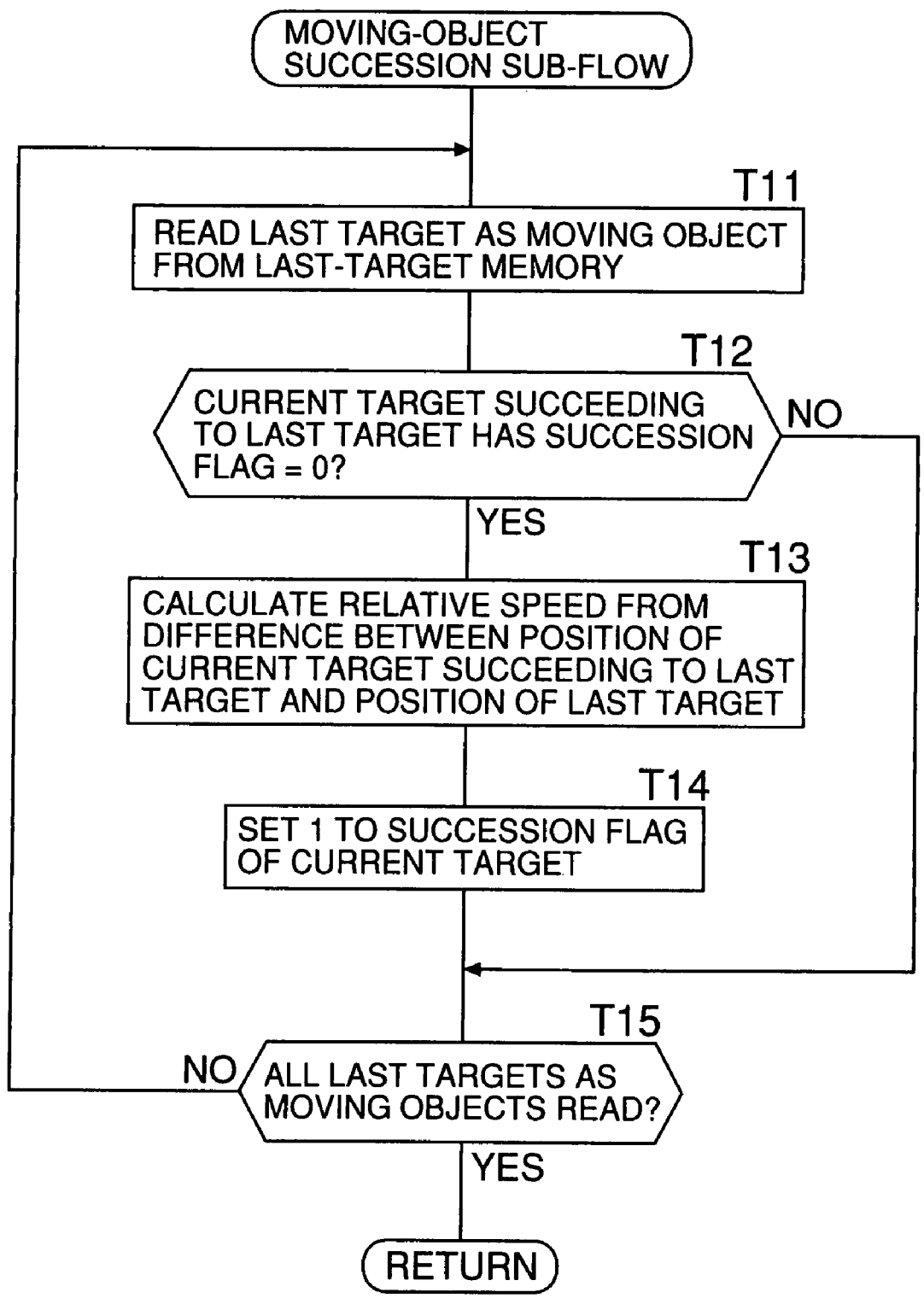
FIG. 17 is a diagram showing a moving-object succession sub-flowchart according to a third embodiment of the present invention.

FIG. 17 shows the details of Step T3 (moving-object succession sub-flow) shown in the flowchart of FIG. 16. First, at Step T11, a last target as a moving object is read from the last-target memory. If the current target succeeding to the last target has a succession flag "0" (succession incomplete) at Step T12, a relative speed of the target to the subject vehicle is calculated from a difference between the position of the succeeding current target and the position of the last target at Step T13. Then, the succession flag of the current target is set to "1" (succession completed) at Step T14. Then, the procedure from Step T11 to T14 is repeated until it is confirmed at Step T15 that all the last targets as last moving objects have been read. Also if the answer is NO at Step T12, the procedure advances to Step T15.

Figure 18:
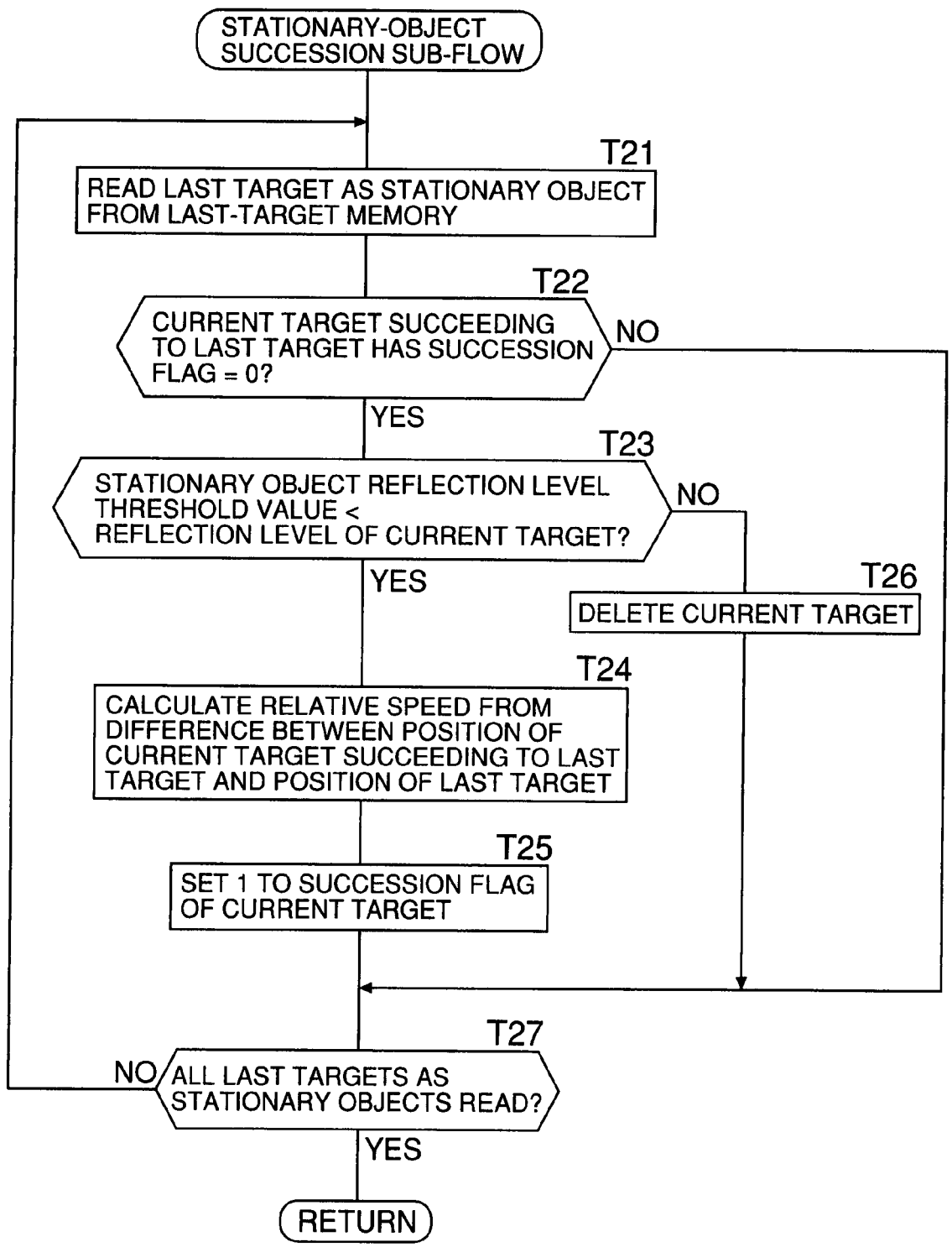
FIG. 18 is a diagram showing a stationary-object succession sub-flowchart according to a third embodiment of the present invention.

FIG. 18 shows the details of Step T4 (stationary-object succession sub-flow) shown in the flowchart of FIG. 16. At Step T21, a last target as a stationary object is read from the last-target memory. If the current target succeeding to the last target has a succession flag "0" at Step T22, and if the stationary object reflection level threshold value is less than the reflection level of the current target at Step T23, a relative speed of the target to the subject vehicle is calculated from a difference between the position of the succeeding current target and the position of the last target at Step T24, and the succession flag of the current target is set at "1" at Step T25. If the stationary object reflection level threshold value is not less than the reflection level of the current target at Step T23, the current target is deleted at Step T26. Then, the procedure from Step T21 to T26 is repeated until it is confirmed at Step T27 that all the last targets as stationary objects have been read. Also, if the answer is NO at Step T23, the processing is advanced to Step T27.

Figure 19:
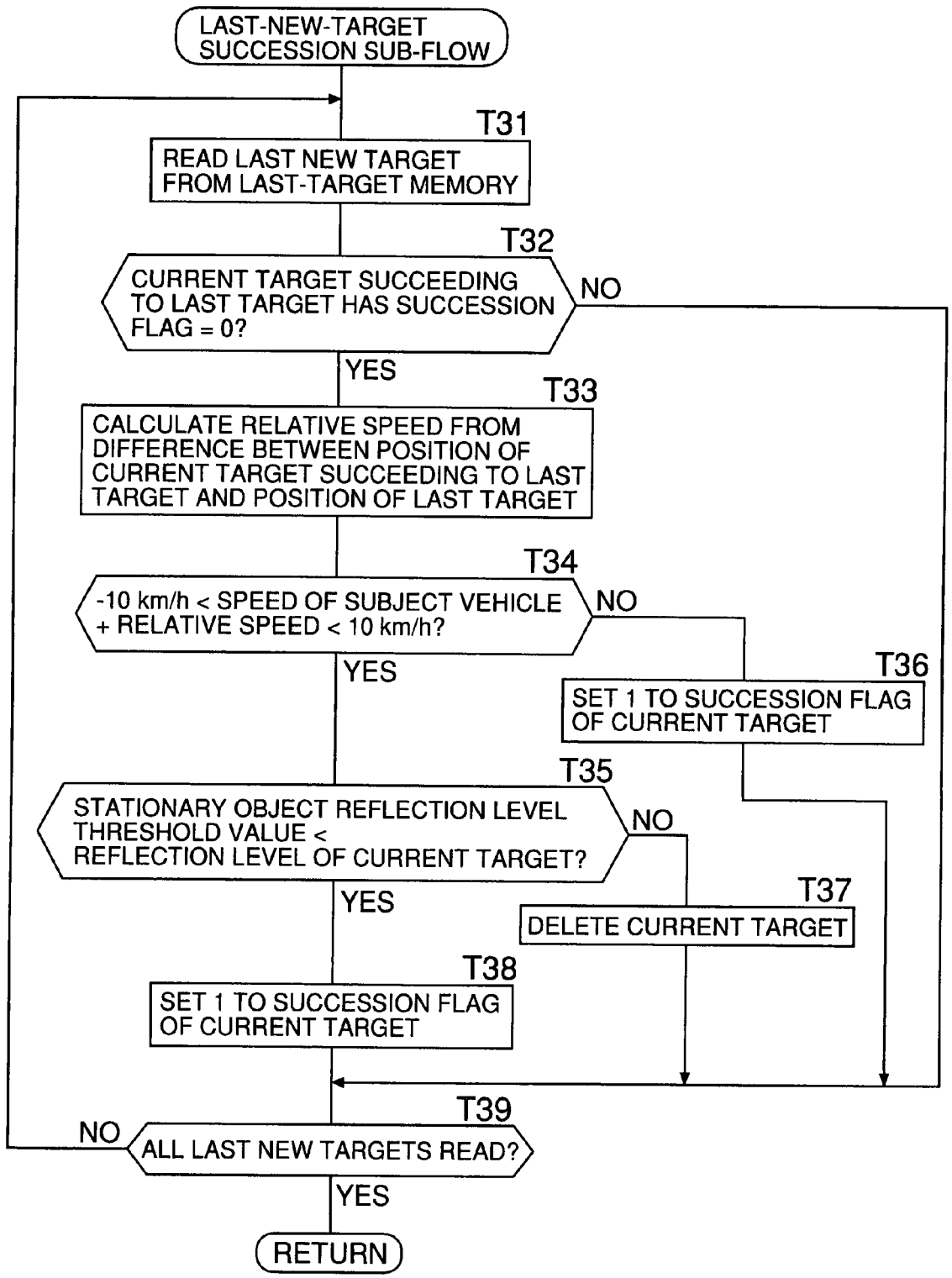
FIG. 19 is a diagram showing a last-new-target succession sub-flowchart according to a third embodiment of the present invention.

FIG. 19 shows the details of Step T5 (last-new-target succession sub-flow) shown in the flowchart of FIG. 16. At Step T31, a last new target is read from the last-target memory, and it is determined at Step T32 whether the current target succeeding to the last target has a succession flag set at "0". In the succession in this case, the last target is the new target and the relative speed cannot yet be calculated. Thus, the range of the estimated position of the current target estimated from the relative position of the last target is set in a wide range compared to the case of the above-described succession.

If the current target succeeding to the last target has a succession flag "0" at Step T32, a relative speed of the target to the subject vehicle is calculated at Step T33 from a difference between the position of the succeeding current target and the position of the last target. If a value obtained by adding the relative speed to the subject vehicle speed is in a range from –10 km/h to +10 km/h at Step T34, namely, if the current target is a stationary object, it is determined at Step T35 whether the stationary object reflection level threshold value is less than the reflection level of the current target. If the value obtained by adding the relative speed to the subject vehicle speed is not in a range from –10 km/h to +10 km/h at Step T34, namely, if the current target is a moving object, the succession flag of the current target is set at "1".

If the stationary object reflection level threshold value is less than the reflection level of the current target at Step T35, the succession flag for the current target is set at "1" at Step T38. If the stationary object reflection level threshold value is not less than the reflection level of the current target at Step T35, the current target is deleted at Step T37. Then, the procedure from Step T31 to Step T38 is repeated until it is confirmed at Step T39 that all the last new targets have been read.

Figure 20:
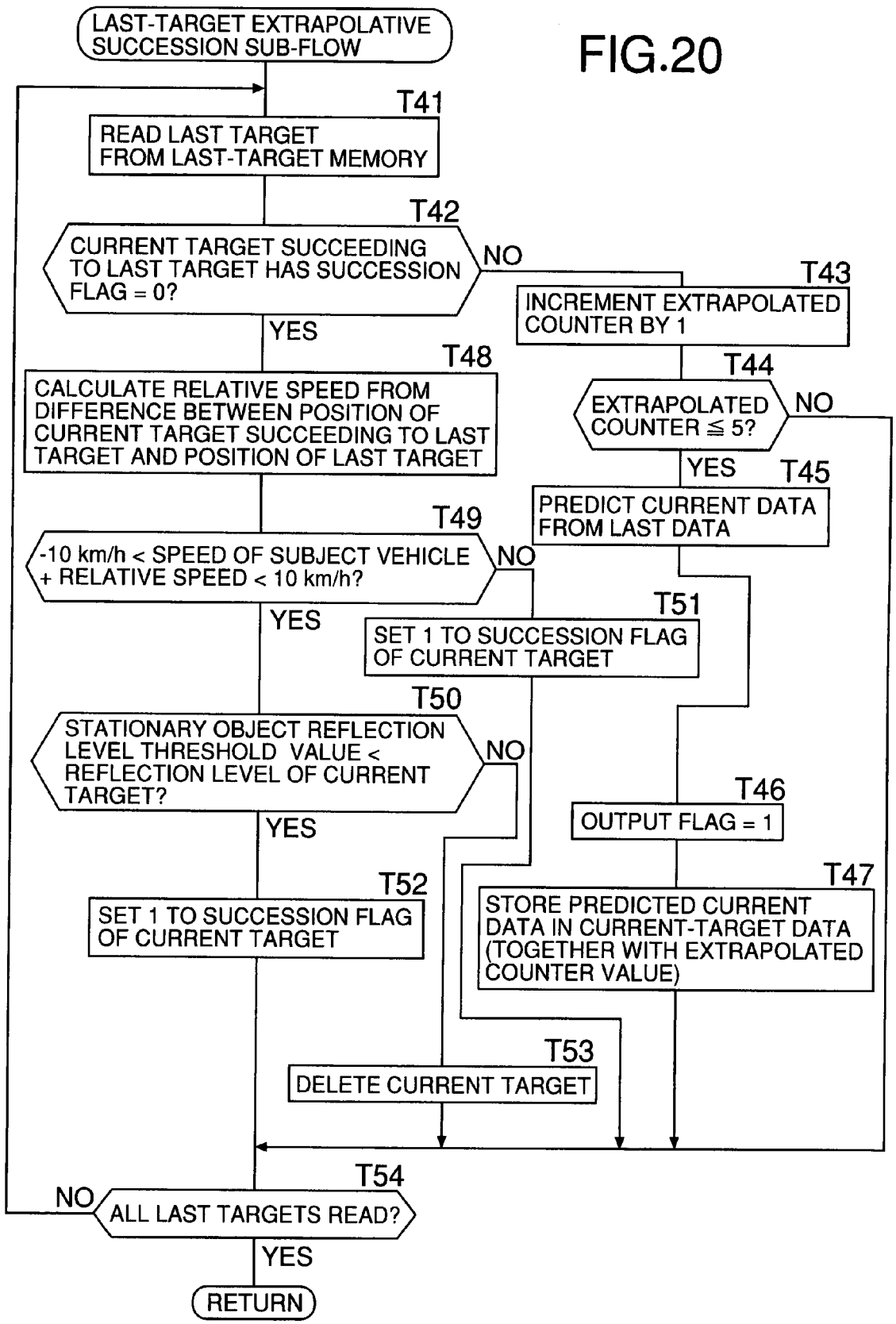
FIG. 20 is a diagram showing a last-target-extrapolative succession sub-flowchart according to a third embodiment of the present invention.

FIG. 20 shows the details of Step T6 (last-target extrapolative succession sub-flow) shown in the flowchart of FIG. 16. First, a last target is read from the last-target memory at Step T41, and it is determined at Step T42 whether the current target succeeding to the last target has a succession flag set at "0". If the answer is NO at Step T42, that is, the last target is not a target succeeded by the current target, the extrapolated counter is increased in increments of 1 at Step T43. If the extrapolated counter has a counter value less than or equal to 5 at Step T44, current data is predicted from the last data at Step T45, namely, a current position of the target is predicted from a last position of the target, and the output flag is set to "1" at Step T46 so that the target becomes a subject of control by the collision preventing system S. At Step T47, the predicted current data and the counter value of the extrapolated counter are stored in the current-target data.

If the counter value of the extrapolated counter is greater than or equal to 6 at Step T44, the output flag cannot be set to "1" at Step T46. Thus, the vehicle control based on the extrapolated data is not performed. This prohibits a low-accuracy vehicle control based on the extrapolated data having the counter value greater than or equal to 6, because the reliability of the extrapolated data is decreased every time the succession is performed.

If the answer is YES at Step T42, that is, the last target is a target succeeded by the current target, a relative speed of the target to the subject vehicle is calculated from a difference between the position of the succeeding current target and the position of the last target at Step T48. If a value obtained by adding the relative speed to the subject vehicle speed is in a range from –10 km/h to +10 km/h at Step T49, namely, if the current target is a stationary object, it is determined at Step T50 whether the stationary object reflection level threshold value is less than the reflection level of the current target. If the value obtained by adding the relative speed to the subject vehicle speed is not in a range from –10 km/h to +10 km/h at Step T49, namely, if the current target is a moving target, the succession flag for the current target is set to "1".

If the stationary object reflection level threshold value is less than the reflection level of the current target at Step T50, the succession flag of the current target is set to "1" at Step T52. If the stationary object reflection level threshold value is not less than the reflection level of the current target at Step T50, the current target is deleted at Step T53. Then, the procedure from Step T41 to Step T53 is repeated until the system confirms at Step T54 that all the last targets have been read.

As described above, if the stationary object reflection level threshold value is not less than the reflection level of the current target at Steps T23, T35 and T50 shown in the flowcharts in FIGS. 18, 19 and 20, namely, if the reflection level of the stationary object, such as a gate or an article in the roadway, is less than or equal to the stationary object reflection level threshold value, the target data as a stationary object is deleted at Steps T26, T37 and T53 shown in the flowcharts in FIGS. 18, 19 and 20. Therefore, the system of the present invention prevents an unnecessary automatic braking and an unnecessary alarm activation for a stationary object such as an article in the roadway over which the subject vehicle can pass or a gate under which the vehicle can pass.

A fourth embodiment of the present invention will now be described with reference to FIGS. 21 to 25.

In the third embodiment of the present invention, when the reception level of the reflected wave from the stationary object is less than or equal to the stationary object detection threshold value, the target is deleted and regarded as having not been detected. However, in the fourth embodiment of the present invention, the extrapolated counter is set to "1" and the deletion of the target is not performed. Generally, current data is predicted from the last data and used as extrapolated data. However, if the reception level of the reflected wave from the stationary object is less than the stationary object detection threshold value and the extrapolated counter is set to "1", the prediction of the current data from the last data is not performed, and the detected data is used as it is.

In the processing by the electronic control unit U, the extrapolated data is also regarded as a subject for which vehicle control is performed, but performing a ½-assist control enables vehicle control corresponding to the extrapolated data having a low accuracy compared to actual data. The term "½-assist control" means a control having an intensity that is weakened compared to the intensity of a full-assist control. Specifically, the ½-assist control occurs when a braking force deceleration is set to be less than a braking force in the full-assist control when the automatic braking is activated where only an alarm is raised. Whereas, automatic braking is activated and an alarm is raised in the full-assist control.

Figure 21:
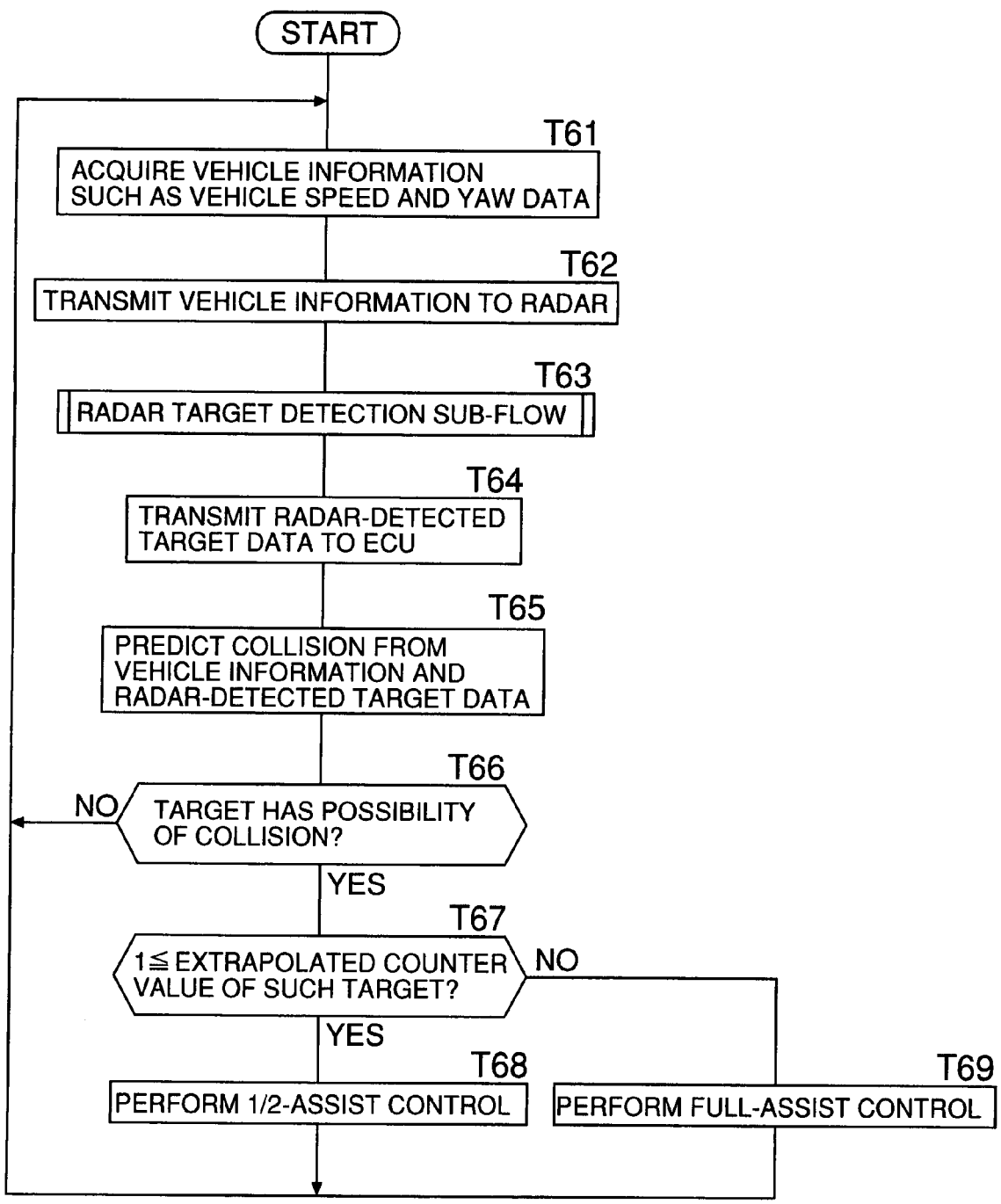
FIG. 21 is a diagram showing a main flowchart according to a fourth embodiment of the present invention.

At Step T61 of a main flow in FIG. 21, vehicle data such as a vehicle speed and a yaw rate are acquired. At Step T62, the vehicle information is transmitted to the radar device R. At Step T63, a radar target detection sub-flow, described below, is performed. At Step T64, a radar-detected target is transmitted to the electronic control unit U, and at Step T65, a prediction of collision is performed from the vehicle information and the radar-detected target. If the system confirms at Step T66 that there is a possibility of collision with a target and if the system confirms at Step T67 that there is a target having an extrapolated counter with a counter value of 1 or more, the ½-assist control is performed at Step T68. If there are no such targets, the full-assist control is performed at Step T69.

Figure 22:
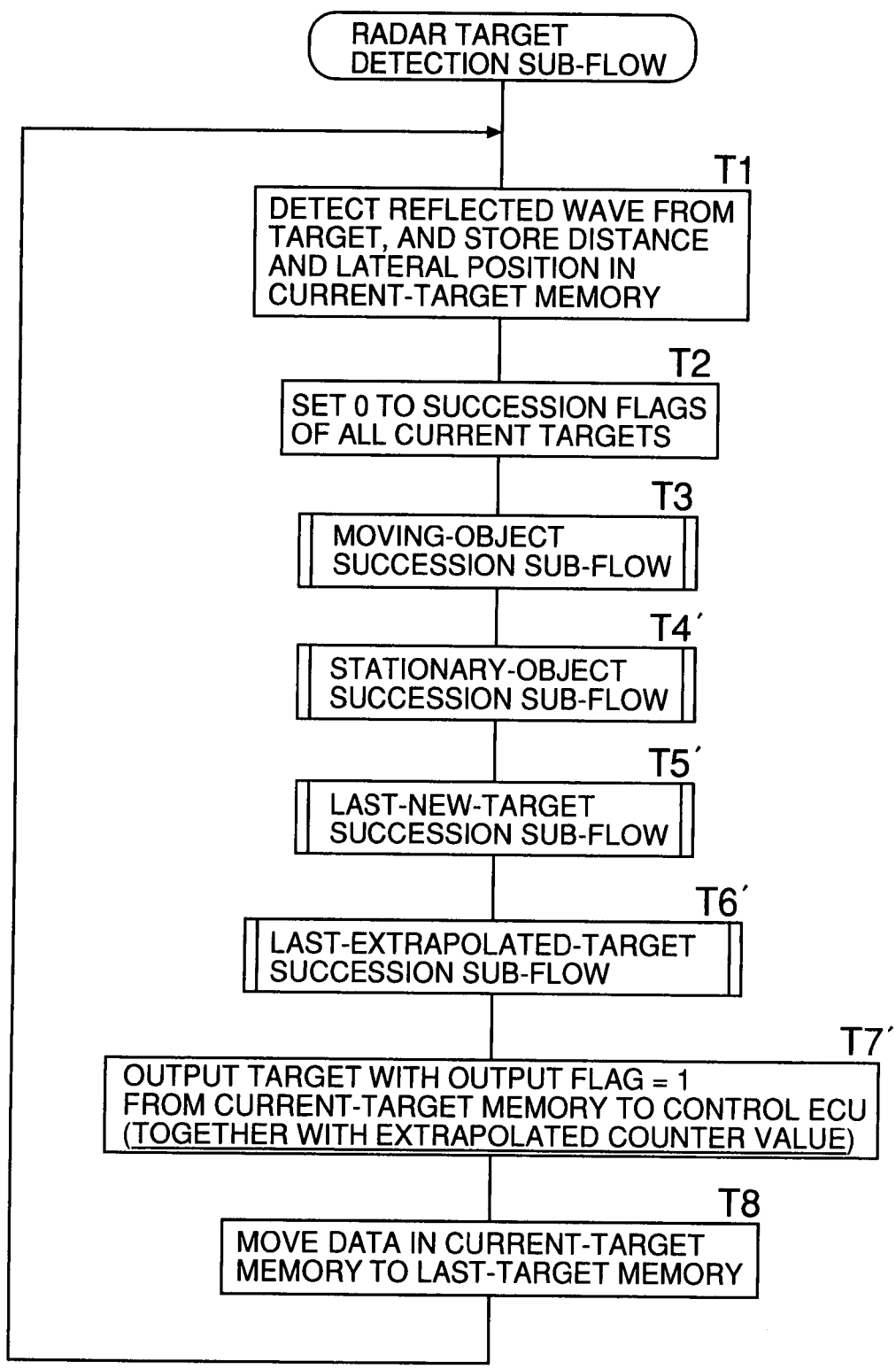
FIG. 22 is a diagram showing a radar target detection sub-flowchart according to a fourth embodiment of the present invention.

FIG. 22 shows the details of Step T63 (radar target detecting sub-flow) shown in the flowchart of FIG. 21. This sub-flow is basically the same as the flowchart in FIG. 16, except that the processing of extrapolated data at Steps T4', T5', T6' and T7' is different. The only difference in the Step T7' is that a target having an output flag set at "1" in the current-target memory is output to the electronic control unit U, and a counter value of the extrapolated counter is output at the same time. The electronic control unit U performs the control also with respect to the extrapolated data.

Figure 23:
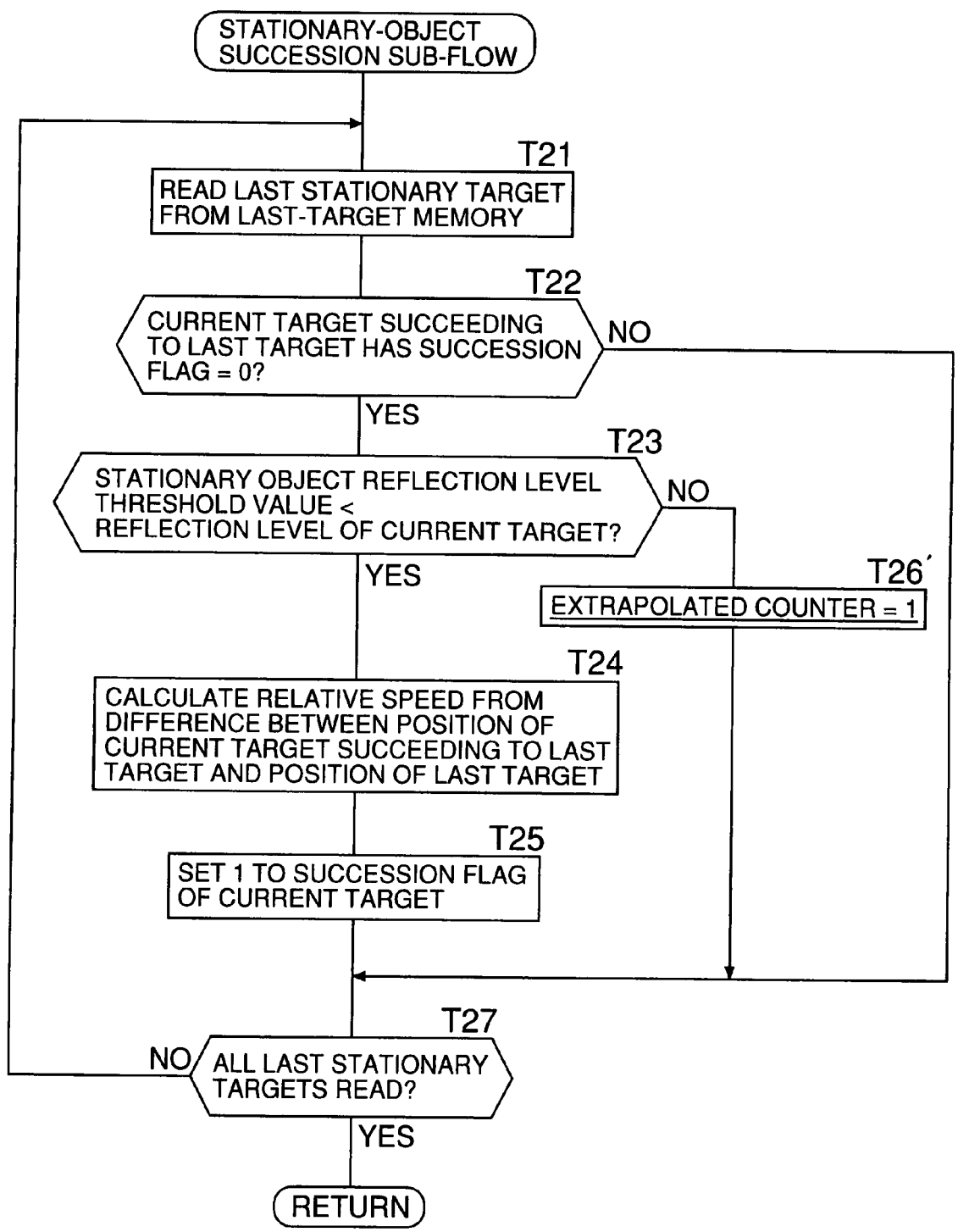
FIG. 23 is a diagram showing a stationary-object succession sub-flowchart according to a fourth embodiment of the present invention.
Figure 24:
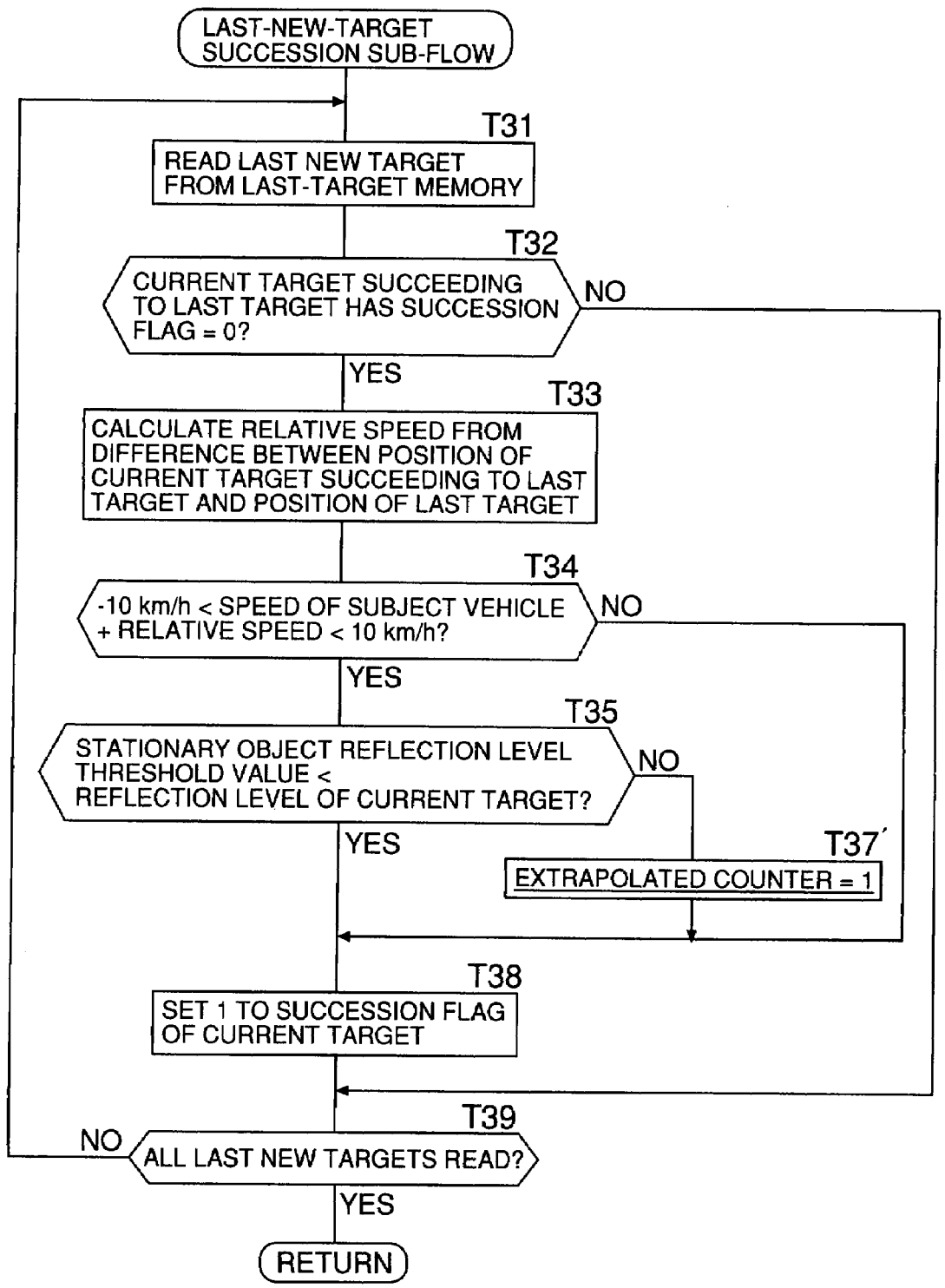
FIG. 24 is a diagram showing a last-new-target succession sub-flowchart according to a fourth embodiment of the present invention.
Figure 25:
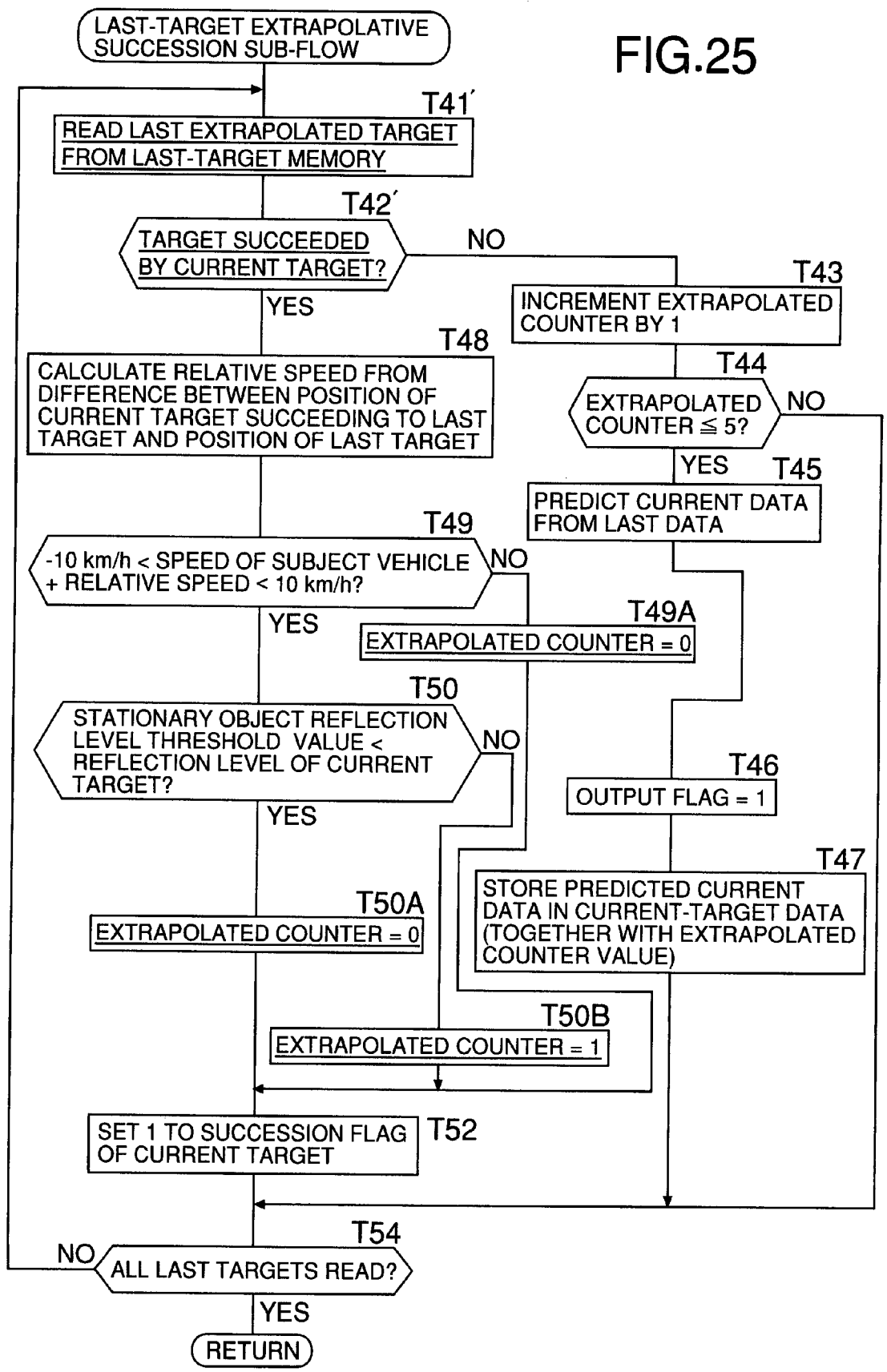
FIG. 25 is a diagram showing a last-target-extrapolative succession sub-flowchart according to a fourth embodiment of the present invention.

In the flowcharts of the fourth embodiment of the present invention shown in FIGS. 23 to 25, an apostrophe or prime symbol ("'") is affixed to each of the numbered steps corresponding to the numbered steps of the flowcharts of the third embodiment, and different captions therein are underlined. Descriptions will be mainly made on these different captions.

FIG. 23 shows the details of Step T4' (stationary-object succession sub-flow) shown in the flowchart of FIG. 22. This sub-flow is basically the same as the flowchart of the third embodiment shown in FIG. 18, except that Step T26' is different from Step T26 of the flowchart in FIG. 18. Specifically, in the flowchart in FIG. 18, if the stationary object reflection level threshold value is not lower than the reflection level of the current target at Step T23, the current target is deleted at Step T26; but in the flowchart shown in FIG. 23, if the stationary object reflection level threshold value is not lower than the reflection level of the current target at Step T23, the extrapolated counter is set to "1" without deleting the current target at Step T26'. At Step T25 of the flowchart in FIG. 23, the succession flag is set to "1", because the succession of the target as a stationary object is performed regardless of whether or not current data is predicted from the last data and used as extrapolated data.

FIG. 24 shows the details of Step T25' (last-new-target succession sub-flow) shown in the flowchart of FIG. 22. This sub-flow is basically the same as the flowchart of the third embodiment shown in FIG. 19, except that Step T37' is different from Step T37 of the flowchart in FIG. 19. Specifically, in the flowchart in FIG. 19, if the stationary object reflection level threshold value is not lower than the reflection level of the current target at Step T34, the current target is deleted at Step T37; but in the flowchart in FIG. 24, if the stationary object reflection level threshold value is not lower than the reflection level of the current target at Step T34, the extrapolated counter is set to "1" without deleting the current target. At Step T38 of the flowchart in FIG. 24, the succession flag is set at "1", because the succession of the stationary target is performed regardless of whether current data is predicted from the last data and used as extrapolated data.

FIG. 25 shows the details of Step T6' (last-target extrapolative succession sub-flow) shown in the flowchart of FIG. 22. This sub-flow is basically the same as the flowchart of the third embodiment shown in FIG. 20, except that Steps T41', T42', T49A, T50A and T50B are different from the flowchart of FIG. 20.

Specifically, at Step T41' of the flowchart in FIG. 25, a last extrapolated target is read from the last-target memory, and it is determined at Step T42' whether the last extrapolated target is a target succeeded by the current target. If the answer is YES at Step T42', that is, the last extrapolated target is the target succeeded by the current target, a relative speed of the target to the subject vehicle is calculated from a difference between the position of the succeeding current target and the position of the last target at Step T48. If a value obtained by adding the relative speed to the subject vehicle speed is in a range from −10 km/h to +10 km/h at Step T49, namely, the current target is a stationary object, it is determined at Step T50 whether the stationary object reflection level threshold value is less than the reflection level of the current target. If the value obtained by adding the relative speed to the subject vehicle speed is not in the range from −10 km/h to +10 km/h at Step T49, namely, the target is a moving object, the extrapolated counter is reset to "0" at Step T49A.

If the stationary object reflection level threshold value is less than the reflection level of the current target at Step T50, the extrapolated counter is reset to "0" at Step T50A. If the stationary object reflection level threshold value is not less than the reflection level of the current target at Step T50, the extrapolated counter is set to "1" at Step T50B. At Step T52, the succession flag is set to "1", because the succession of the stationary target is performed regardless of whether current data is predicted from the last data and used as extrapolated data.

As described above, in the fourth embodiment, when the reception level of the reflected wave from the stationary object is less than or equal to the stationary object detection threshold value, the extrapolated counter is set to "1" without deleting the target, and the detected data is used without predicting current data from the last data. The extrapolated data is also used as a subject for which vehicle control is performed. However, performing a ½-assist control enables a vehicle control corresponding to extrapolated data having a low accuracy compared to actual data.

Although the embodiments of the present invention have been described in detail, various modifications in design may be made without departing from the subject matter of the invention.

Figure 26A:
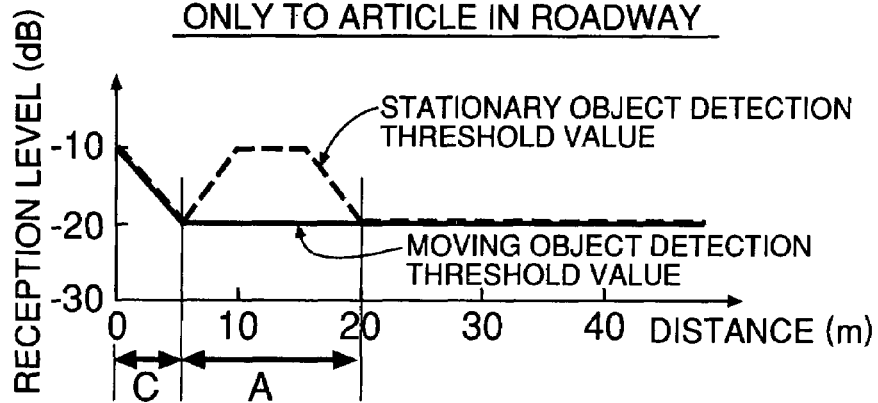
FIGS. 26A to 26C are diagrams showing other examples of detection threshold values.
Figure 26B:
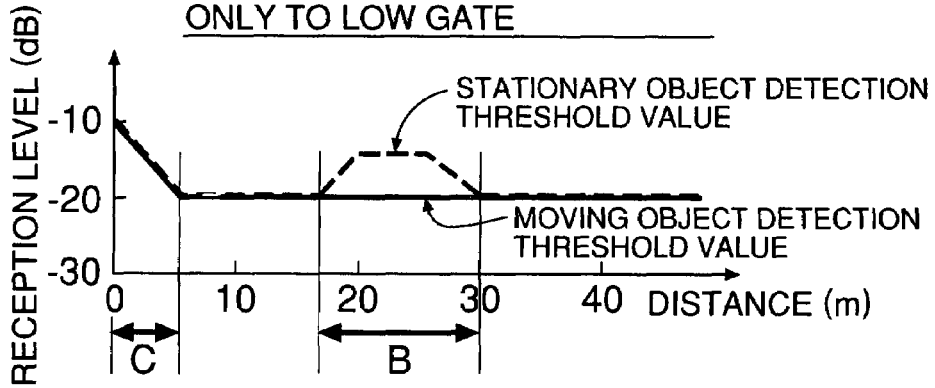
Figure 26C:
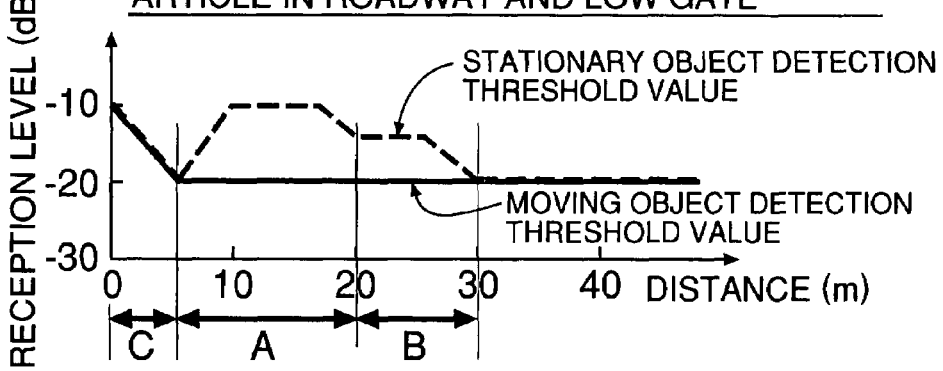

For example, the setting of the moving object detection threshold value is not limited to the example shown in FIGS. 7A and 7B. In the example shown in FIG. 26A, the detection threshold value is increased to −10 dB only in the region A from 5 m to 20 m in order to prevent the detection of an article in the roadway. In the example shown in FIG. 26B, the detection threshold value is increased to −10 dB only in the region B from 15 m to 30 m in order to prevent the detection of a low gate. In the example shown in FIG. 26C, the detection threshold value is increased to −10 dB in the region A from 5 m to 20 m and to −15 dB in the region B from 20 m to 30 m. Thus, it is possible to set an appropriate detection threshold value corresponding to an article in the roadway over a lower end of the detection area and corresponding to a gate over an upper end of the detection area.

What is claimed is:

1. A vehicle control system comprising:
    a transmitter mounted on a vehicle for transmitting an electromagnetic wave toward a predetermined detection area;

a receiver for receiving reflected waves of the electromagnetic wave transmitted by the transmitter and reflected from an object;

an object detector for detecting the object based on one of the reflected waves received by the receiver, the reflected waves having a reception level greater than or equal to a detection threshold value; and a vehicle controller for controlling the vehicle based on a result of the detection by the object detector;

an object-type discriminator for discriminating whether the object detected by the object detector is a moving object or a stationary object; and a stationary-object detection threshold value setter for setting a stationary object detection threshold value higher than the detection threshold value over a predetermined distance range, wherein, when a reception level of a reflected wave from the object, which is determined to be a stationary object, is less than or equal to the stationary object detection threshold value in the predetermined distance range, the vehicle controller determines that the stationary object is not an object for which the vehicle is controlled, and wherein, as said stationary object detection threshold value, there are set a first stationary object detection threshold value for a region of the predetermined distance range close to the vehicle and a second stationary object detection threshold value for a region of the predetermined distance range distanced from the vehicle, the second stationary object detection threshold value being set lower than the first stationary object detection threshold value.

2. A vehicle control system comprising:

a transmitter mounted on a vehicle for transmitting an electromagnetic wave toward a predetermined detection area;

a receiver for receiving reflected waves of the electromagnetic wave transmitted by the transmitter and reflected from an object;

an object detector for detecting the object based on one of the reflected waves received by the receiver, the reflected waves having a reception level greater than or equal to a detection threshold value;

a vehicle controller for controlling the vehicle based on a result of the detection by the object detectors;

an object-type discriminator for discriminating whether the object detected by the object detector is a moving object or a stationary object; and a stationary-object detection threshold value setter for setting a stationary object detection threshold value higher than the detection threshold value over a predetermined distance range, wherein, when a reception level of a reflected wave from the object, which is determined to be a stationary object, is less than or equal to the stationary object detection threshold value in the predetermined distance range, the vehicle controller changes a manner of controlling the vehicle with respect to the stationary object, and wherein, as said stationary object detection threshold value, there are set a first stationary object detection threshold value for a first region of the predetermined distance range close to the vehicle and a second stationary object detection threshold value for a second region of the predetermined distance range distanced from the vehicle, the second stationary object detection threshold value being set lower than the first stationary object detection threshold value.

3. The vehicle control system according to claim 2, wherein the vehicle controller performs a deceleration control of the vehicle with respect to the object existing in a traveling direction of the vehicle having a reception level grater than or equal to the detection threshold value; and when the reception level of the reflected waves from the object, which is determined to be a stationary object, is less than or equal to the stationary object detection threshold value in the predetermined distance range, the vehicle controller prevents the deceleration control of the vehicle with respect to the stationary object.

4. The vehicle control system according to claim 2, wherein the predetermined distance range is a range of about 5 m to 30 m ahead of the vehicle.

5. The vehicle control system according to claim 2, wherein the first region of the predetermined distance range is a range of about 5 m to 20 m, and the second region of the predetermined distance range is a range of about 20 m to 30 m; and the stationary-object detection threshold value setter sets the stationary object detection threshold value in the second region of the predetermined distance range at a value lower than the stationary object detection threshold value in the first region of the predetermined distance range.

6. The vehicle control system according to claim 2, further comprising:

a vehicle speed detector for detecting a vehicle speed, and a relative speed calculator for calculating a relative speed between the detected object and the vehicle, wherein the object-type discriminator discriminates whether the object detected based on the vehicle speed and the relative speed is a moving object or a stationary object.

7. A vehicle control system comprising:

a transmitter mounted on a vehicle for transmitting an electromagnetic wave toward a predetermined detection area;

a receiver for receiving a reflected wave of the electromagnetic wave transmitted by the transmitter and reflected from an object;

an object detector for detecting the object existing in a detection area based on the reflected wave received by the receiver having a reception level greater than or equal to a detection threshold value;

an object-position calculator for calculating a position of the object based on a result of the detection by the object detector;

an object moving-speed calculator for calculating a moving speed of the object based on a last position and a current position of the object calculated by the object-position calculator;

a vehicle controller for controlling the vehicle based on outputs from the object-position calculator and the object moving-speed calculator;

an object-type discriminator for discriminating whether the object detected by the object detector is a moving object or a stationary object, based on the output from the object moving-speed calculator; and a detection threshold value setter for setting a stationary object detection threshold value higher than the detection threshold value over a predetermined distance range, wherein, when a reception level of the reflected wave from the object, which is determined to be a stationary object, is less than or equal to the stationary object detection threshold value in the predetermined distance range, the vehicle controller determines that the stationary object is not an object for which the vehicle is controlled, or the vehicle controller changes a manner of controlling the vehicle with respect to the stationary object, and wherein, as said stationary object detection threshold value, there are set a first stationary object detection threshold value for a first region of the predetermined distance range close to the vehicle and a second stationary object detection threshold value for a second region of the predetermined distance range distanced from the vehicle, the second stationary object detection threshold value being set lower than the first stationary object detection threshold value.

8. A vehicle control system according to claim 7, wherein the detection threshold value setter sets a moving object detection threshold value different from the stationary object detection threshold value; and when a reception level of a reflected wave from the object, which is determined to be a moving object, is less than or equal to the moving object detection threshold value, the vehicle controller changes a manner of controlling the vehicle with respect to the moving object.

9. A vehicle control system according to claim 7, wherein the vehicle controller performs a deceleration control of the vehicle with respect to the object existing in a traveling direction of the vehicle having a reception level greater than or equal to the detection threshold value; and when the reception level of the reflected wave from the stationary object is less than or equal to the stationary object detection threshold value, the vehicle controller prevents the deceleration control of the vehicle with respect to the stationary object.

10. The vehicle control system according to claim 7, wherein the predetermined distance range is a range of about 5 m to 30 m ahead of the vehicle.

11. The vehicle control system according to claim 7, wherein the first region of the predetermined distance range is a range of about 5 m to 20 m, and the second region of the predetermined distance range is a range of about 20 m to 30 m; and the detection threshold value setter sets the stationary object detection threshold value in the second region of the predetermined distance range at a value lower than the stationary object detection threshold value in the first region of the predetermined distance range.

12. The vehicle control system according to claim 1, wherein the predetermined distance range is a range of about 5 m to 30 m ahead of the vehicle.

13. The vehicle control system according to claim 1, wherein the first region of the predetermined distance range is a range of about 5 m to 20 m, and the second region of the predetermined distance range is a range of about 20 m to 30 m.

14. The vehicle control system according to claim 1, further comprising:

a vehicle speed detector for detecting a vehicle speed, and a relative speed calculator for calculating a relative speed between the detected object and the vehicle, wherein the object-type discriminator discriminates whether the object detected based on the vehicle speed and the relative speed is a moving object or a stationary object.

* * * * *